United States Patent [19]
Kano

[11] Patent Number: 5,852,817
[45] Date of Patent: Dec. 22, 1998

[54] INTELLIGENT CONTROL APPARATUS

[75] Inventor: Makoto Kano, Urayasu, Japan

[73] Assignee: Kabushiki Kaisha Toshiba, Kawasaki, Japan

[21] Appl. No.: 732,966

[22] Filed: Oct. 10, 1996

Related U.S. Application Data

[63] Continuation-in-part of Ser. No. 199,014, Feb. 18, 1994, Pat. No. 5,566,275, which is a continuation-in-part of Ser. No. 929,111, Aug. 13, 1992, Pat. No. 5,428,559.

[30] Foreign Application Priority Data

| Aug. 14, 1991 | [JP] | Japan | 3-204494 |
| Feb. 19, 1993 | [JP] | Japan | 5-030580 |
| Oct. 13, 1995 | [JP] | Japan | 7-265086 |

[51] Int. Cl.$^6$ ............................ G06F 15/46; G06F 15/18
[52] U.S. Cl. ........................... 706/23; 706/16; 706/903
[58] Field of Search ...................... 395/22, 23, 11, 395/903; 706/23, 16, 903

[56] References Cited

U.S. PATENT DOCUMENTS

| 4,195,337 | 3/1980 | Bertrand et al. | 364/151 |
| 4,578,747 | 3/1986 | Hideg et al. | 364/151 |
| 4,990,838 | 2/1991 | Kawato et al. | 395/22 |
| 5,025,282 | 6/1991 | Nakamura et al. | 395/22 |
| 5,033,006 | 7/1991 | Ishizuka et al. | 395/23 |
| 5,092,343 | 3/1992 | Spitzer et al. | 2/115 |
| 5,095,443 | 3/1992 | Watanabe | 395/11 |
| 5,109,275 | 4/1992 | Naka et al. | 395/22 |
| 5,111,516 | 5/1992 | Nakano et al. | 382/156 |
| 5,119,468 | 6/1992 | Owens | 395/22 |
| 5,134,396 | 7/1992 | Sirat et al. | 395/22 |
| 5,159,660 | 10/1992 | Lu et al. | 395/22 |
| 5,204,872 | 4/1993 | Staib et al. | 395/11 |
| 5,220,373 | 6/1993 | Kanaya | 395/11 |
| 5,285,377 | 2/1994 | Sugasaka et al. | 395/23 |
| 5,305,230 | 4/1994 | Matsumoto et al. | 395/906 |
| 5,353,207 | 10/1994 | Keeler et al. | 395/23 |
| 5,402,367 | 3/1995 | Sullivan et al. | 364/578 |
| 5,414,619 | 5/1995 | Katayama et al. | 395/903 |
| 5,434,783 | 7/1995 | Pal et al. | 364/508 |
| 5,534,638 | 7/1996 | Keeler et al. | 364/424.03 |
| 5,613,041 | 3/1997 | Keeler et al. | 395/23 |

OTHER PUBLICATIONS

Leahy, M.B., et al., "Neural Network Payload Estimation for Adaptive Robot Control," IEEE Trans. on NN, V.2, N.1, Jan. 1991, pp. 93–100.

Kawato M. et al., "Hierarchical NN Model for Voluntary Movement with Application to Robotics", IEEE Control System Magazine, Apr. 30, 1988, pp. 8–15.

Franklin, J.A., "Refinement of Robot Motor Skills Reinforcement Learning", Proc. of 27th IEEE CDC, 1988, pp. 1096–1101.

Fry et al., "Back–Propagation Learning and Nonidealities in Analog Neural Network Hardware", IEEE Trans. on Neural Networks, vol. 2, No. 1, Jan. 1991, pp. 110–117.

Handelman, D.S., et al., "Integrating Nns and Knowledge–Based Systems for Intelligent Robotic Control", IEEE Control Systems Magazine, Apr. 30, 1990, pp. 77–87.

Juvva et al, "An Intelligent Controller Using a self–learning Neural Network," IEEE International Conference on Industrial Automation and Control, 1995.

*Primary Examiner*—George B. Davis
*Attorney, Agent, or Firm*—Banner & Witcoff

[57] ABSTRACT

A control apparatus for controlling a control amount of a control target by changing an operating amount which is supplied to the control target, comprises an adjusting section for calculating an adjustment signal in accordance with the control amount measured by the control target and a target control amount, an operating section for transmitting an operating amount to the control target in accordance with the adjustment signal calculated by the adjusting section, an observation data storing section for storing observation data having control amounts and operating amounts observed previously, and a learning section for learning internal parameters for the adjusting section in accordance with response time taken for the control target from input of the operating amount from the operating section to the control target to appearance of an influence of the operating amount on the control amount and observation data stored in the observation data storing section.

38 Claims, 17 Drawing Sheets

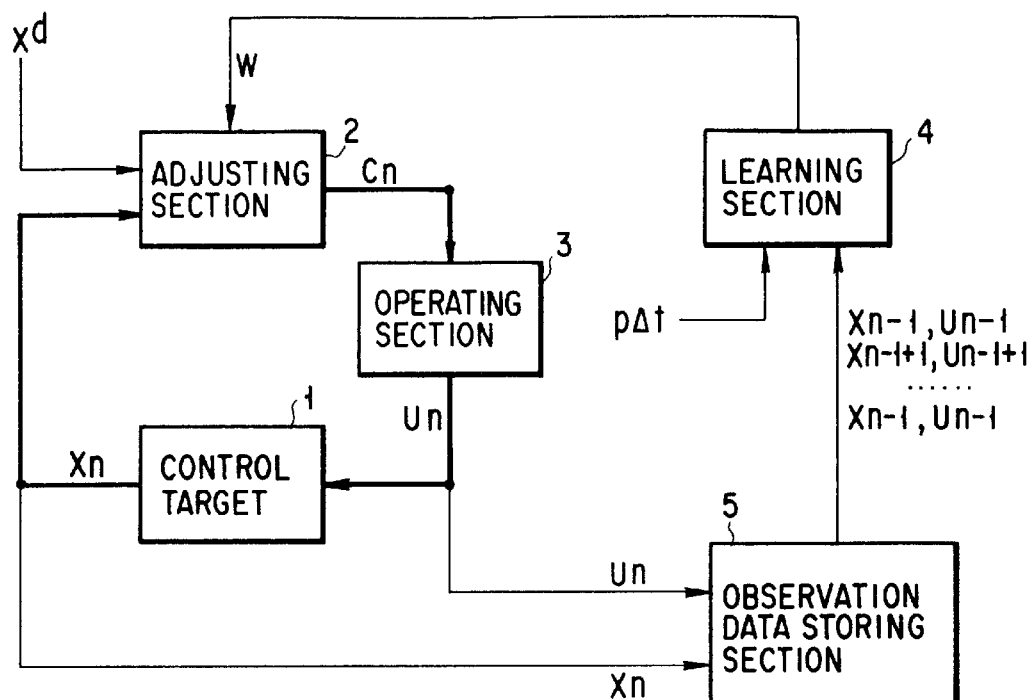
F I G. 1
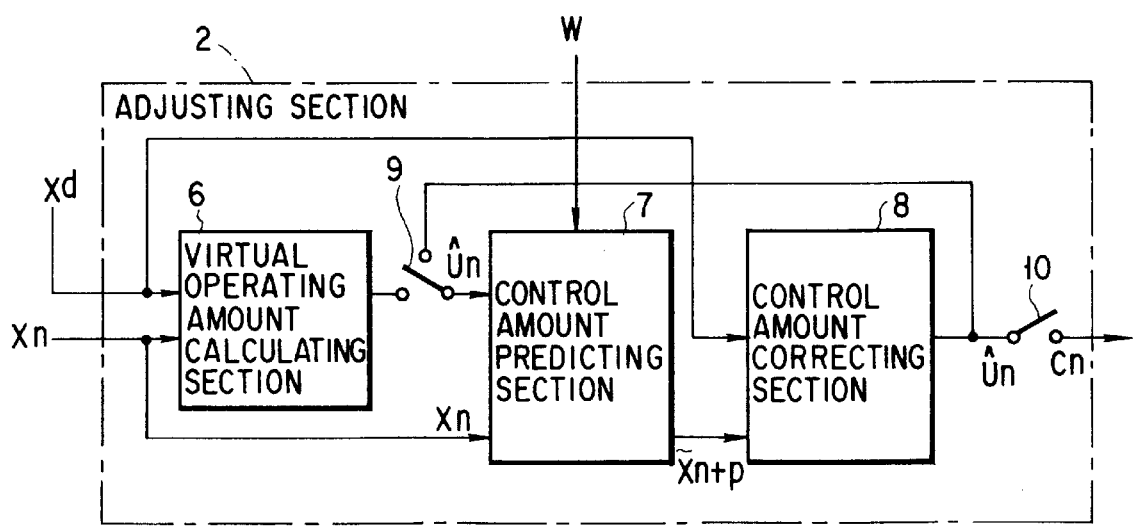
F I G. 2

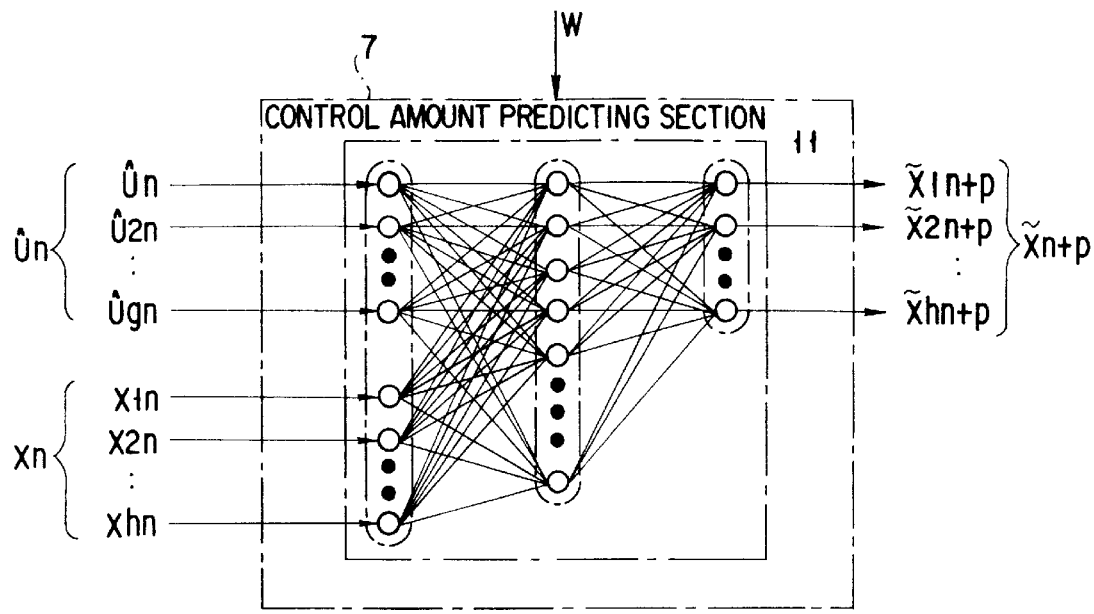
F I G. 3
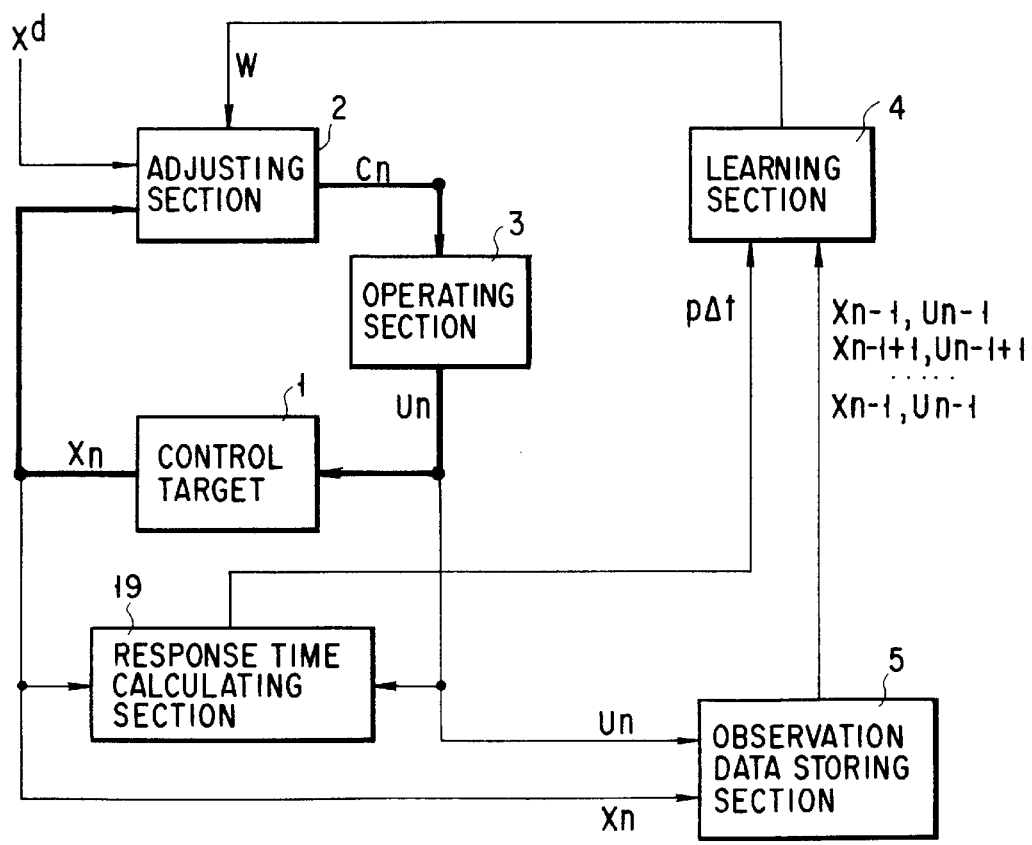
F I G. 5

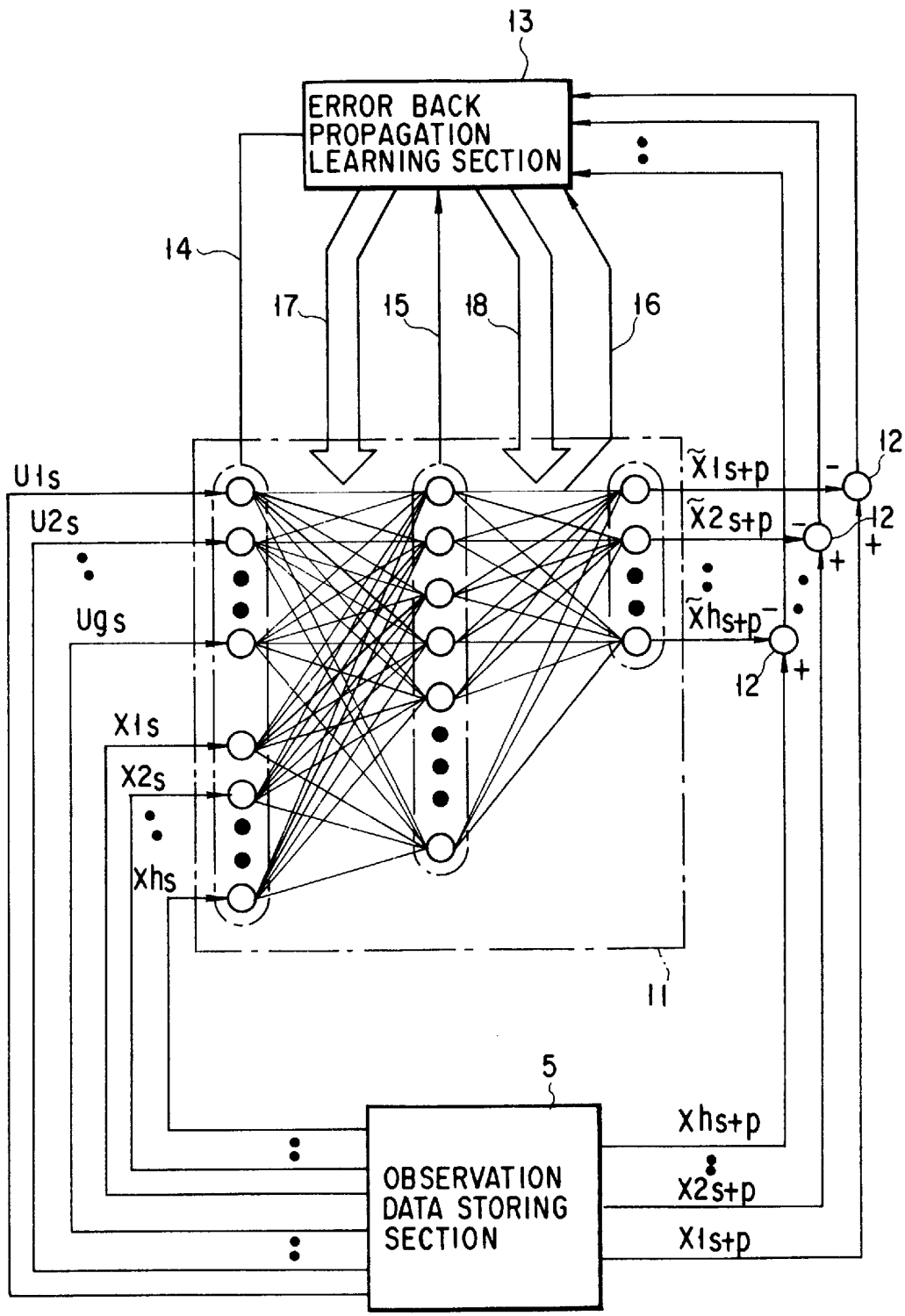
F I G. 4

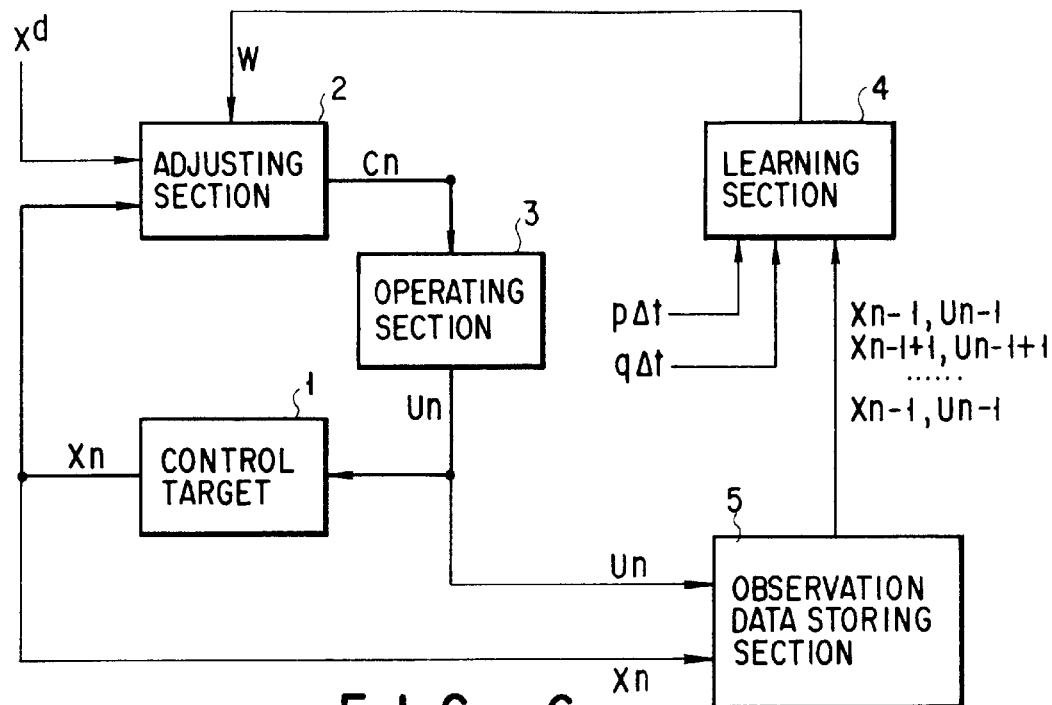
F I G. 6
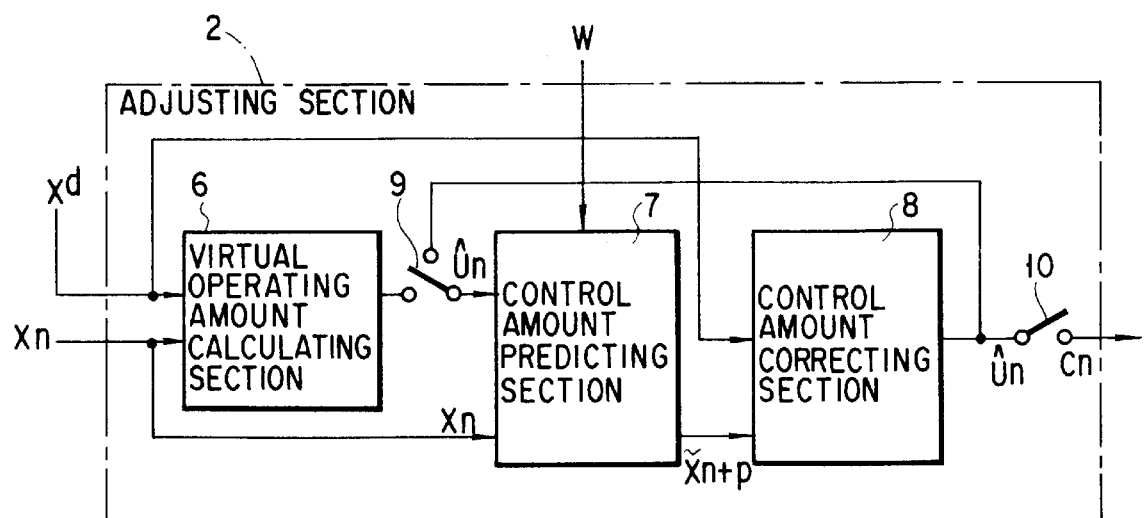
F I G. 7

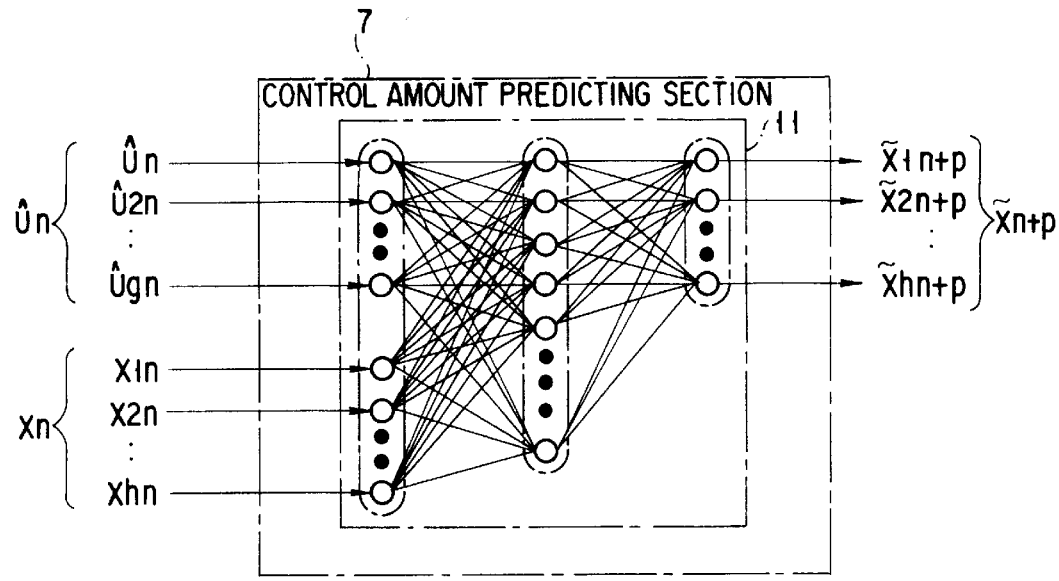
F I G. 8
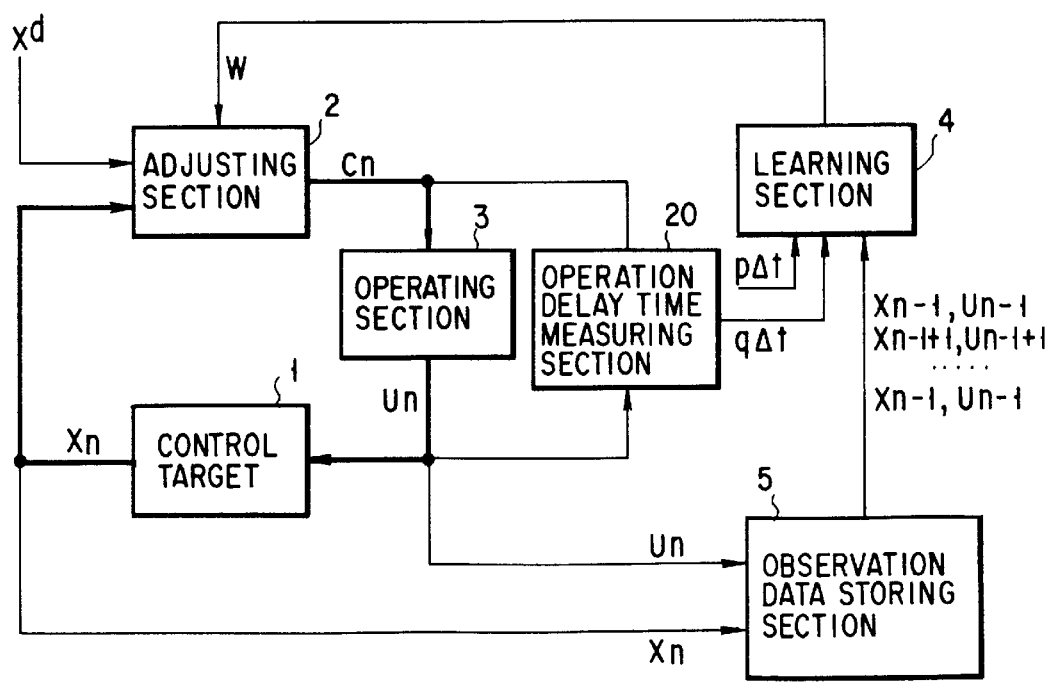
F I G. 10

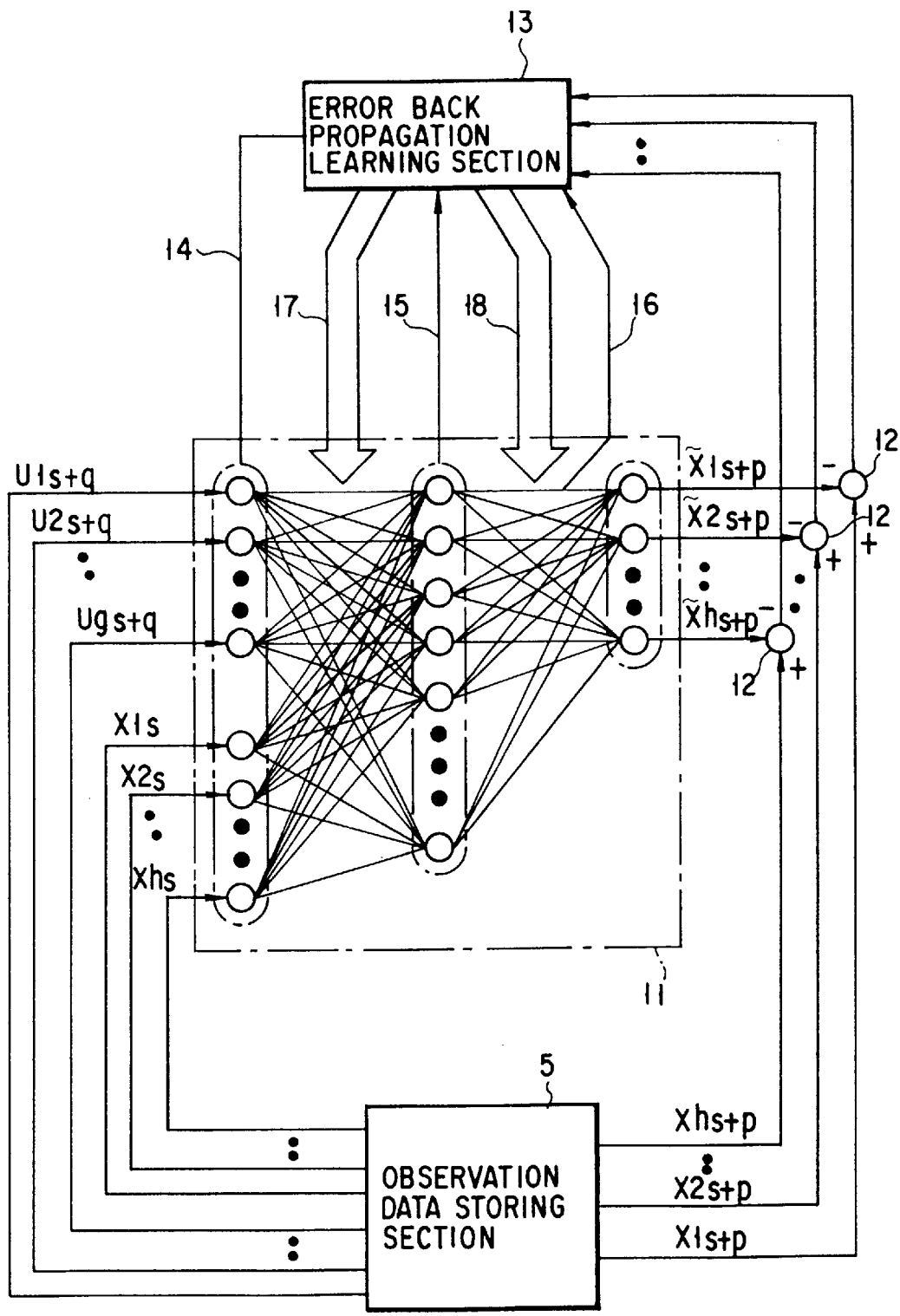
F I G. 9

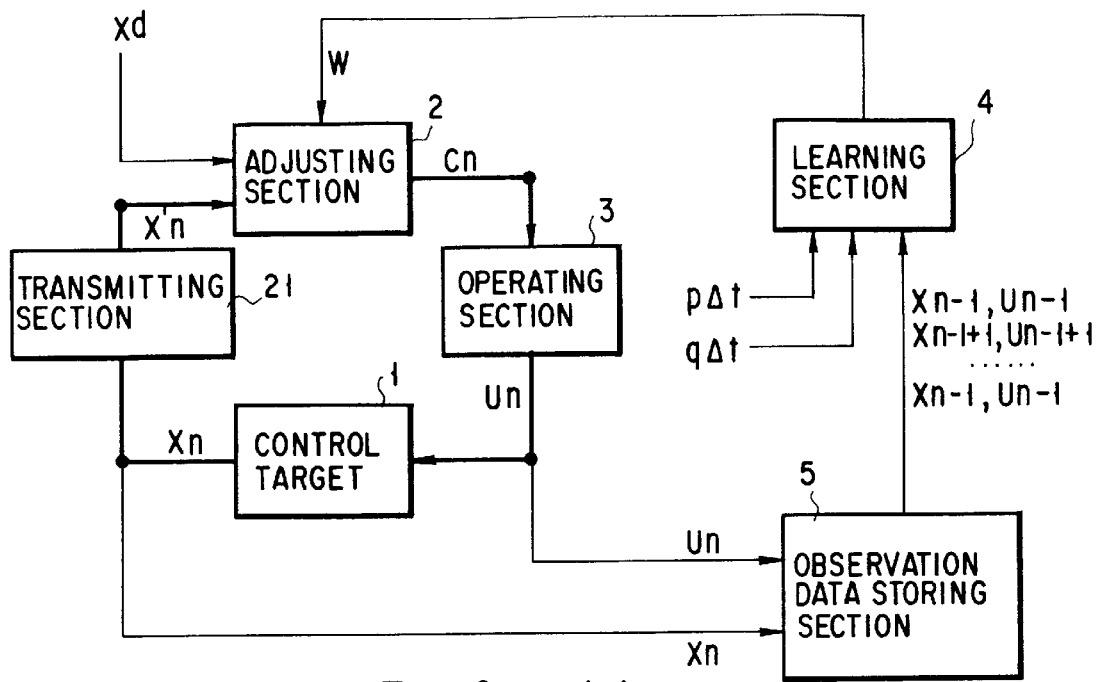
F I G. 11
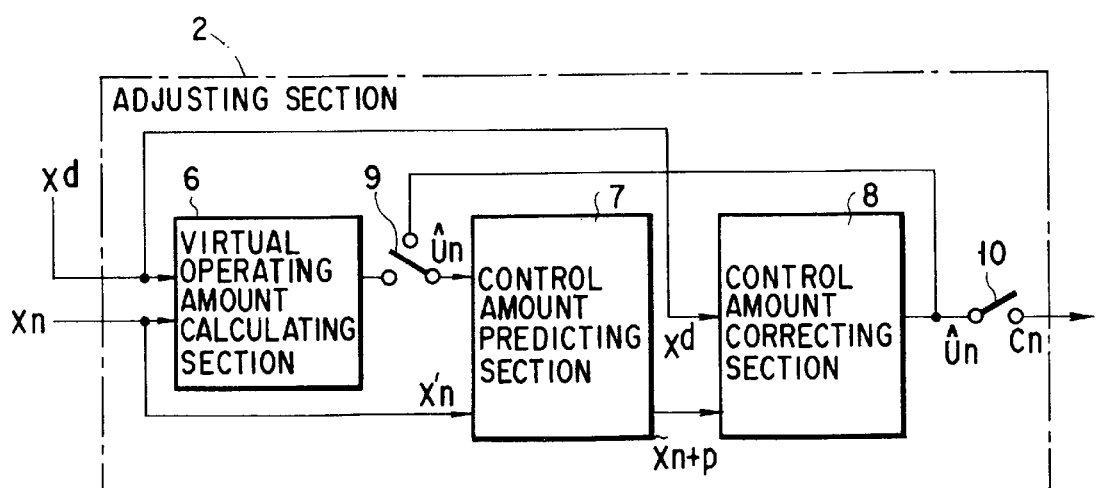
F I G. 12

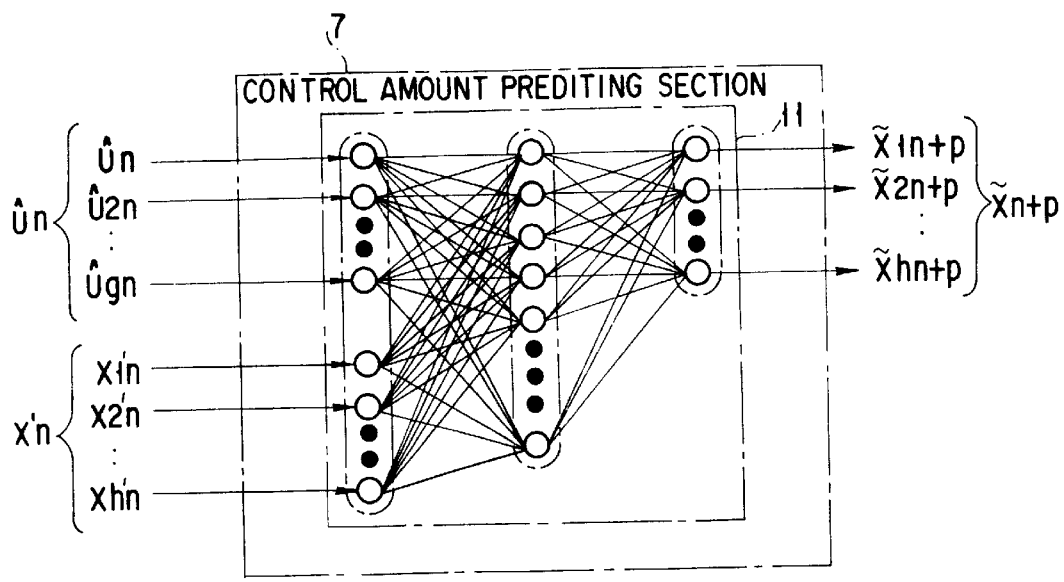
F I G. 13
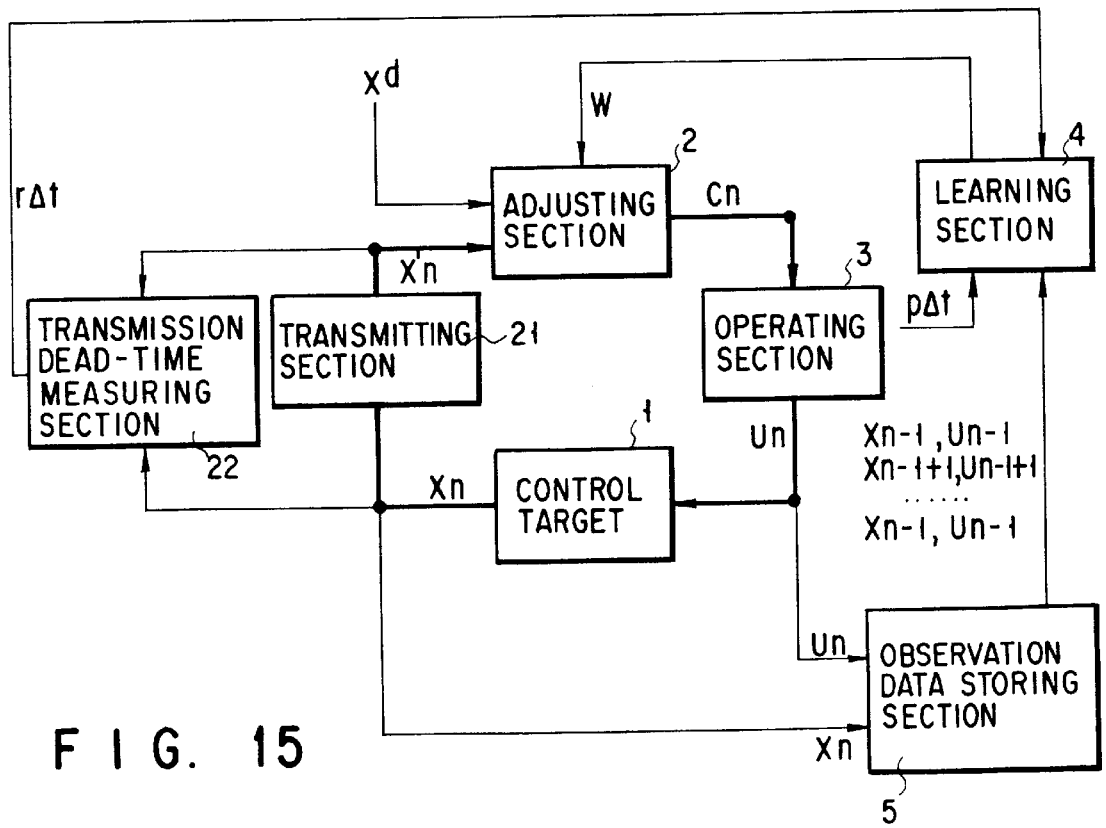
F I G. 15

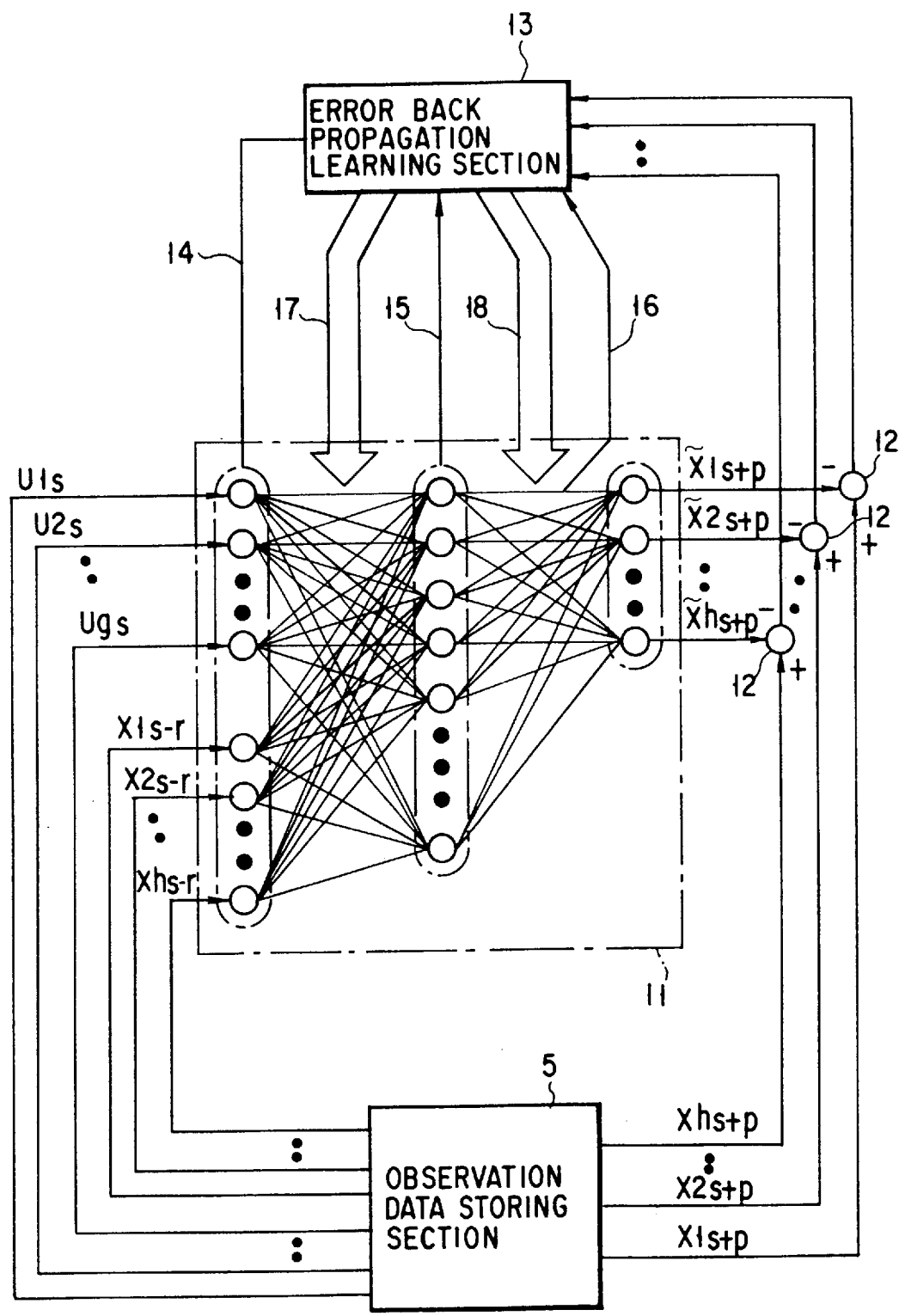
F I G. 14

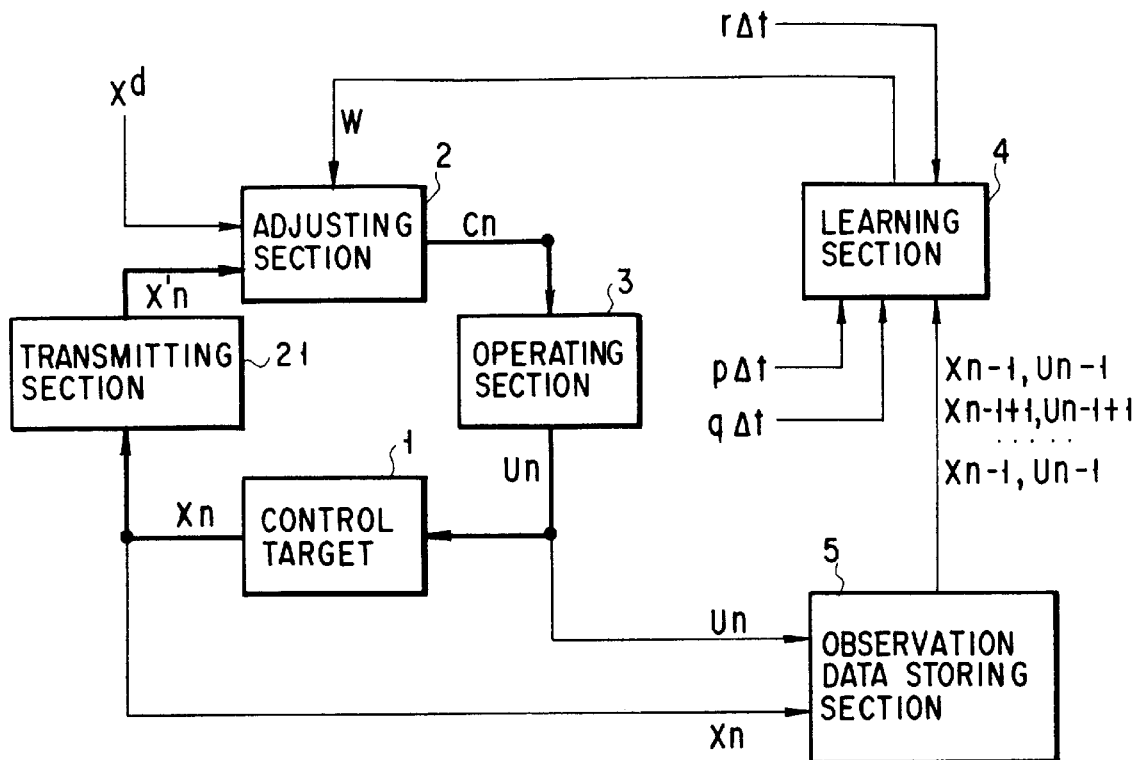
F I G. 16
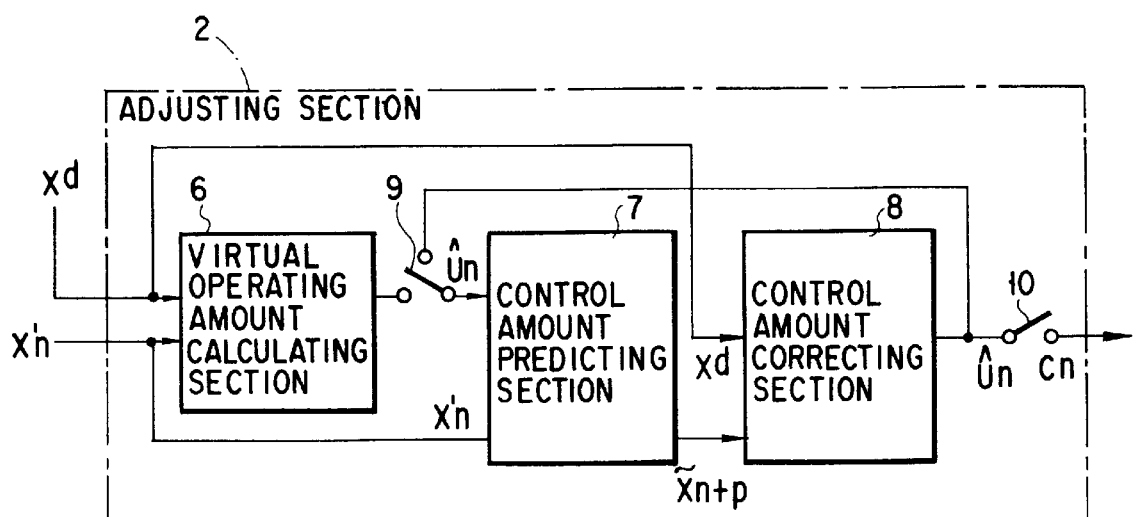
F I G. 17

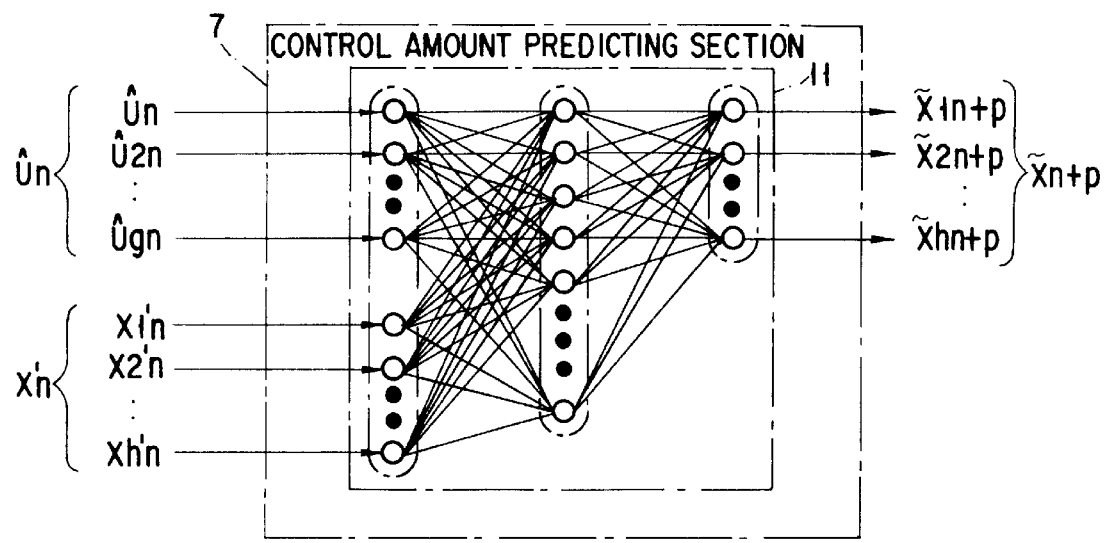
F I G. 18
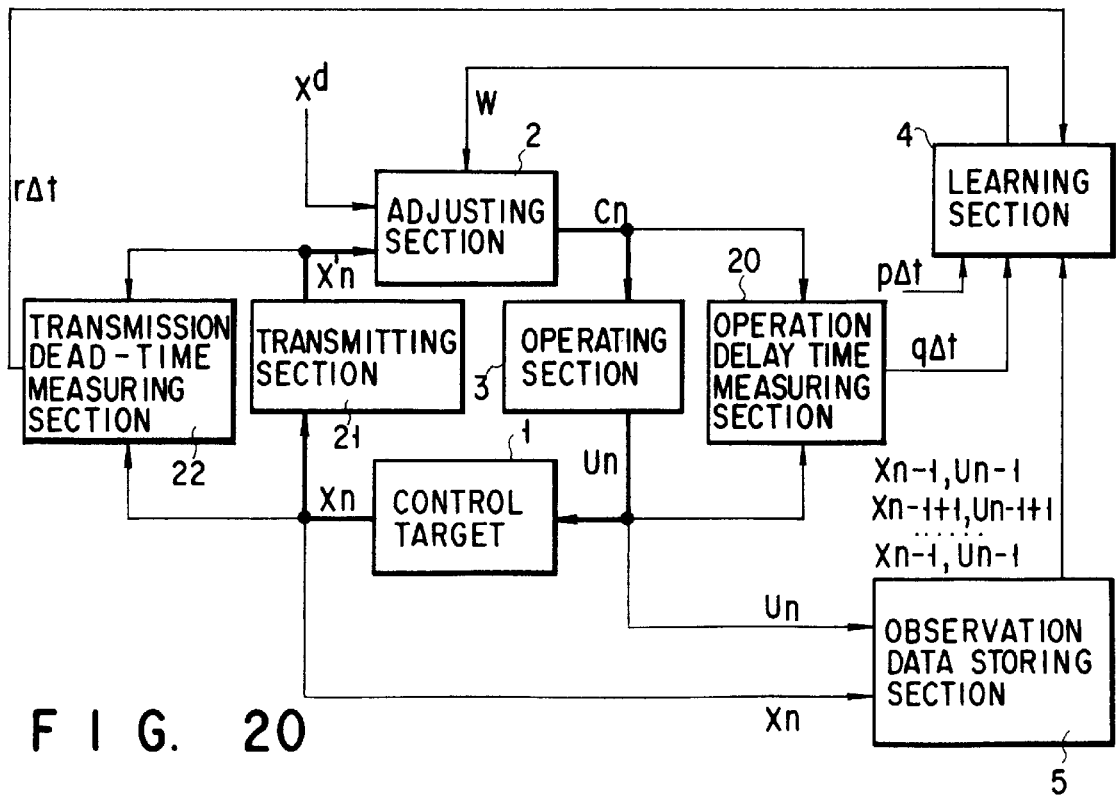
F I G. 20

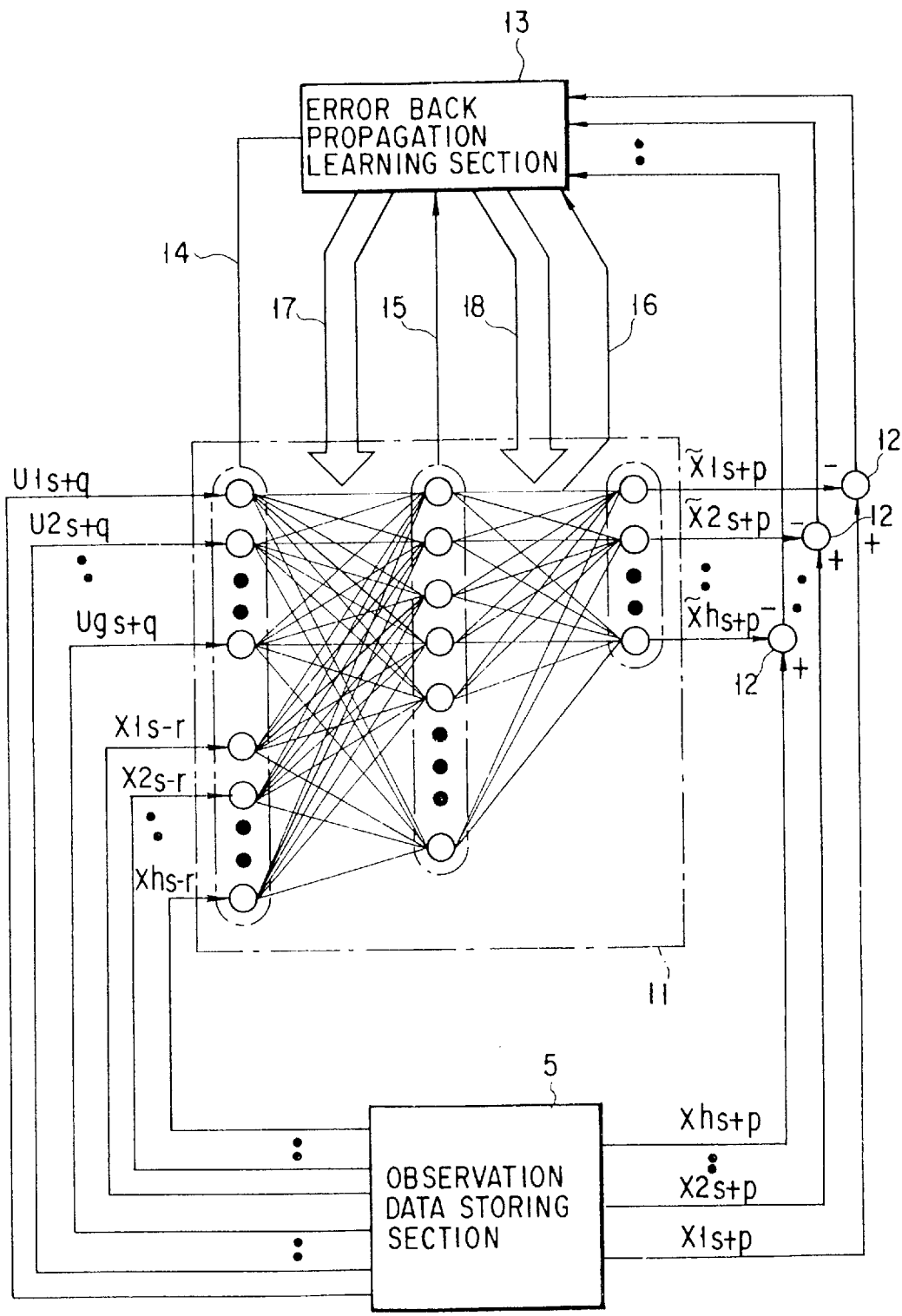
F I G. 19

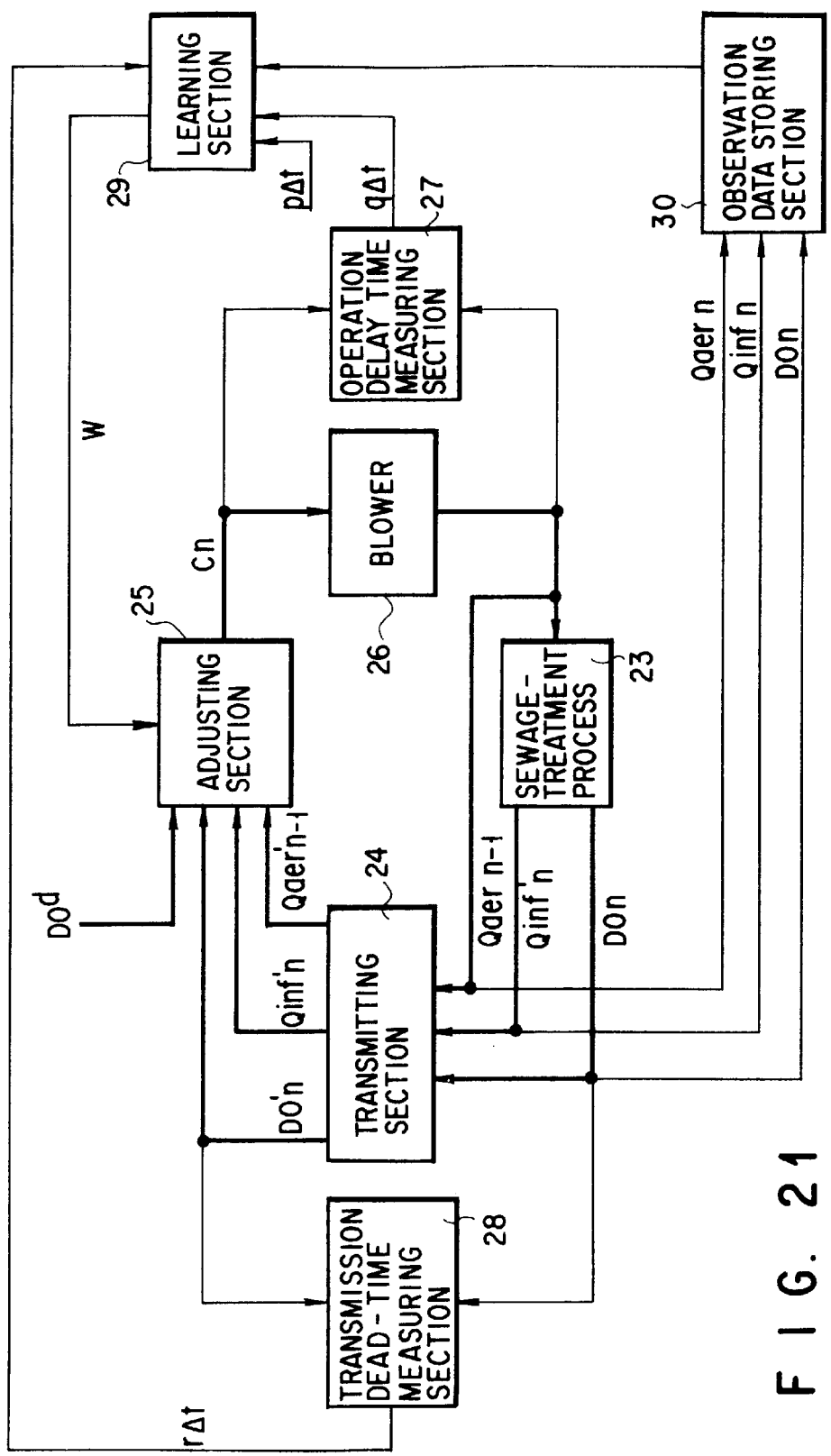
F I G. 21

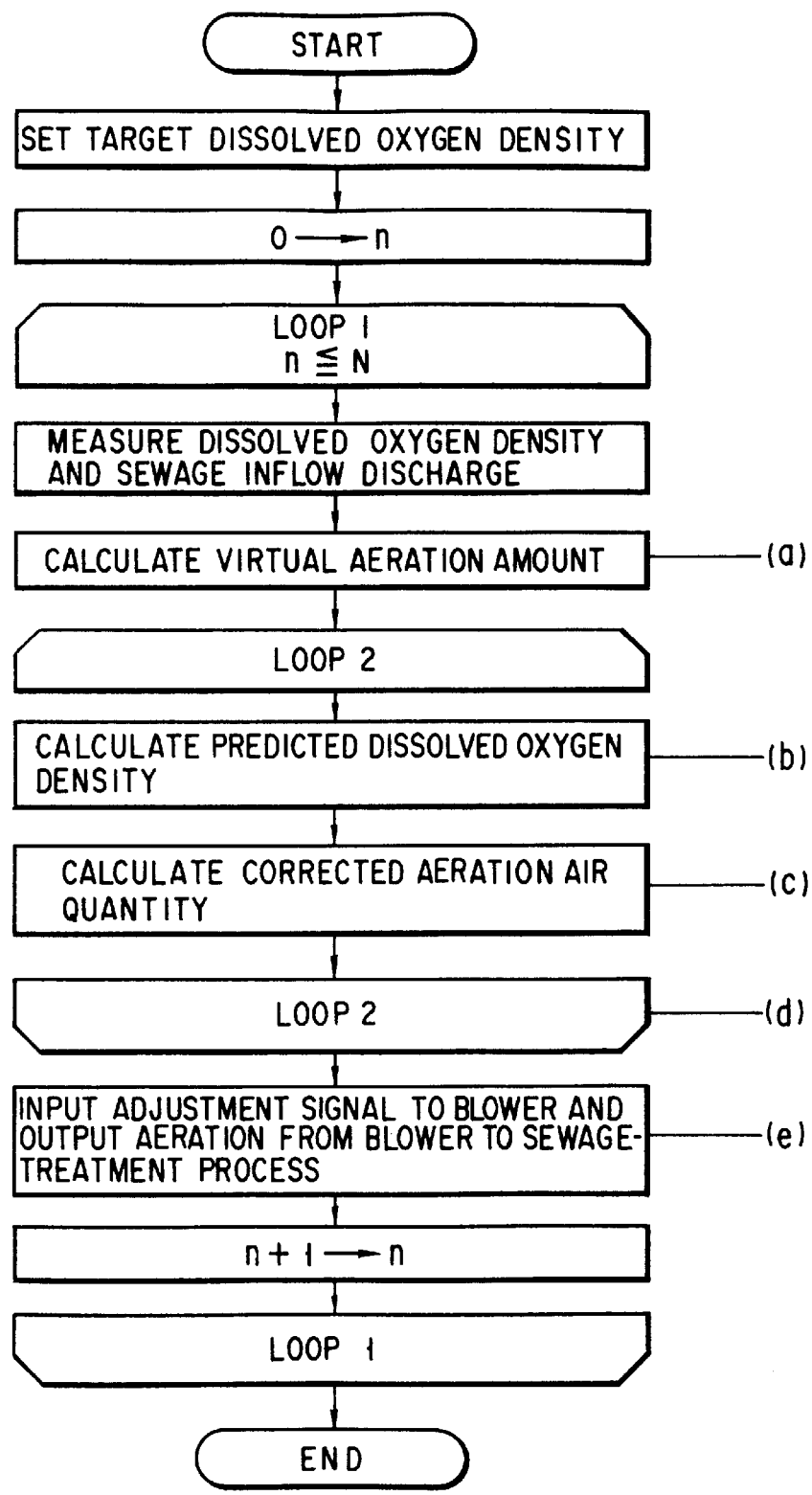
F I G. 25

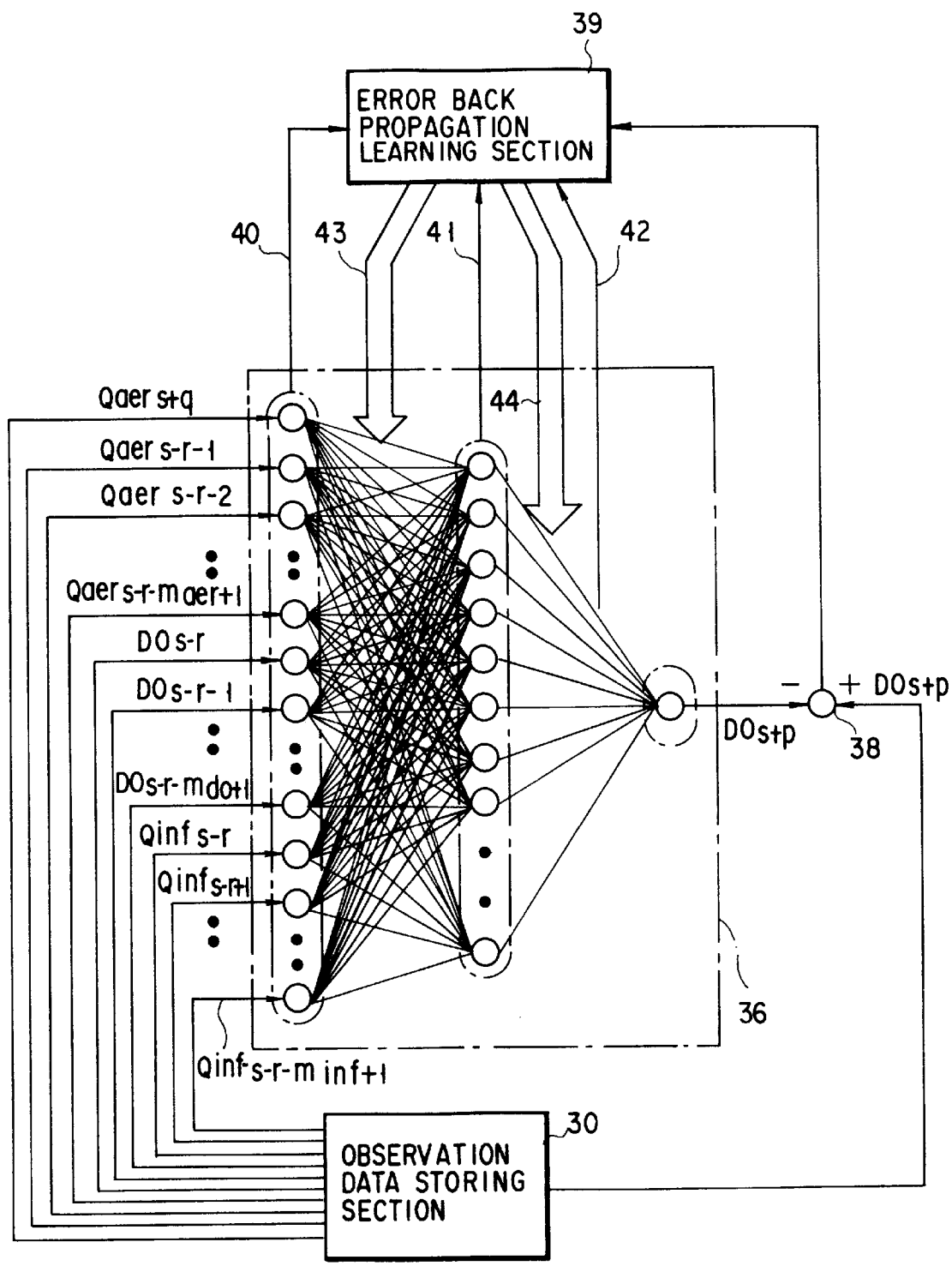
F I G. 26

INTELLIGENT CONTROL APPARATUS

CROSS-REFERENCE TO THE RELATED APPLICATION

This application is a continuation-in-part of application Ser. No. 08/199,014 filed on Feb. 18, 1994, U.S. Pat. No. 5,566,275 which is a continuation-in-part of application Ser. No. 07/929,111 filed on Aug. 13, 1992, U.S. Pat. No. 5,428,559.

BACKGROUND OF THE INVENTION

1. Field of the Invention

The present invention relates to a control apparatus for controlling, to a predetermined level, the dissolved oxygen density in, for example, an aeration tank of a sewage-treatment facility.

2. Description of the Related Art

A control apparatus for controlling a system of the foregoing type is required to be adaptable to moderate change in the characteristics of a control target and as well as coping with rapid change in the state of the control target which affects the control amount. The dissolved oxygen density in an aeration tank of a sewage-treatment facility is feedback-controlled such that the aeration air quantity is determined in accordance with an error between the observed dissolved oxygen density in the sewage and a desired dissolved oxygen density. However, if the inflow of the sewage is rapidly changed attributable to rainfall or the like, the feedback method cannot accurately control the control target. In this case, a monitoring operator must manually adjust the aeration air quantity. Moreover, the gain constant of the feedback control must be adjusted to cope with the rapid change in the dissolved oxygen density occurring due to the rapid change in the inflow of the sewage. Moreover, the gain constant must be adjusted also when the characteristics of the sewage-treatment process have been seasonally changed.

It might therefore be feasible to employ a contrivance in which an adjusting section of the control apparatus is adjusted by performing a learning operation such that observation data is used so as to cope with the moderate change in the characteristics of the control target, and a loop in which prediction of the control amount of the control target and the correction of the operating amount is provided for the adjusting section in order to be coping with rapid change in the state of the control target which affects the control amount.

However, even if the foregoing countermeasure is taken, the practical system cannot perform accurate control because of existence of variable time factors in the feedback control loop. That is, for example, time lapses from a moment at which the operating amount has been instructed to the control target to a moment at which the control amount is affected by the operating amount. Moreover, time lapses from a moment at which the adjusting amount is determined in the adjusting section to a moment at which the operating amount is instructed from the operating section to the control target in accordance with the adjusting amount. In addition, time taken for the control amount measured by the control target to be transmitted to the adjusting section is unintentionally delayed.

SUMMARY OF THE INVENTION

An object of the present invention is to provide a control apparatus capable of performing accurate control in consideration of time factors included in a loop for use in feedback control.

A first control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; and learning means for learning internal parameters for the adjusting means in accordance with response time taken for the control target from input of the operating amount from the operating means to the control target to appearance of an influence of the operating amount on the control amount and observation data stored in the observation data storing means.

Another first control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; response time calculating means for calculating response time taken for the control target from input of the operating amount from the operating means to the control target to appearance of an influence of the operating amount on the control amount in accordance with the operating amount transmitted from the operating means and the control amount measured by the control target; and learning means for learning internal parameters for the adjusting means in accordance with the response time calculated by the response time calculating means and observation data stored in the observation data storing means.

With the above configuration, (1) The adjusting means has virtual operating amount calculating means for calculating a virtual operating amount in accordance with the control amount measured by the control target and the target control amount; control amount predicting means for predicting a control amount after the response time has elapsed in accordance with the control amount measured by the control target and the virtual operating amount; operating amount correcting means for correcting the virtual operating amount in accordance with the predicted control amount after the response time has elapsed which has been predicted by the control amount predicting means and the target control amount; and means for supplying, to the operating means, a virtual operating amount as an adjustment signal, the virtual operating amount being obtained by, at least once, performing prediction of the control amount performed by the control amount predicting means and correction of the virtual operating amount.

(2) The control amount predicting means includes a neural circuit model; calculations in the operating amount correcting means are performed by error back propagation calculations of the neural circuit model; and the learning means generates learning data in accordance with the response time and observation data stored in the observation data storing means so as to perform leaning of the neural circuit model forming the control amount predicting means.

(3) The learning means performs learning such that observation data having the control amount and the operating amount at the same time is used as an input signal and the control amount after the response time has elapsed is used as a teacher signal when learning data is generated in accordance with the observation data stored in the observation data storing means.

A second control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; and learning means for learning internal parameters for the adjusting means in accordance with response time taken for the control target from input of the operating amount from the operating means to the control target to appearance of an influence of the operating amount on the control amount, operation delay time taken for the adjustment signal calculated by the adjusting means to appear as an operating amount through the operating means and observation data stored in the observation data storing means.

Another second control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; operation delay time measuring means for measuring operation delay time taken for the adjustment signal calculated by the adjusting means to appear as an operating amount through the operating means in accordance with the adjustment signal calculated by the adjusting means and the operating amount transmitted from the operating means; and learning means for learning internal parameters for the adjusting means in accordance with the operation delay time calculated by the operation delay time measuring means, the response time of the control target taken from input of the operating amount from the operating means to the control target to appearance of the operating amount on the control amount and observation data stored in the observation data storing means.

In the first and second control apparatus, (1) The adjusting means has virtual operating amount calculating means for calculating a virtual operating amount in accordance with the control amount measured by the control target and the target control amount; control amount predicting means for predicting a control amount after the response time has elapsed in accordance with the control amount measured by the control target and the virtual operating amount; operating amount correcting means for correcting the virtual operating amount in accordance with the predicted control amount after the response time has elapsed which has been predicted by the control amount predicting means and the target control amount; and means for supplying, to the operating means, a virtual operating amount as an adjustment signal, the virtual operating amount being obtained by, at least once, performing prediction of the control amount performed by the control amount predicting means and correction of the virtual operating amount.

(2) The control amount predicting means includes a neural circuit model; calculations in the operating amount correcting means are performed by error back propagation calculations of the neural circuit model; and the learning means generates learning data in accordance with the response time, the operation delay time and observation data stored in the observation data storing means so as to perform leaning of the neural circuit model forming the control amount predicting means.

(3) The learning means performs learning such that observation data having the control amount at the present time and an operating amount after the operation delay time from the present time is used as an input signal and the control amount after the response time has elapsed is used as a teacher signal when learning data is generated in accordance with the observation data stored in the observation data storing means.

A third control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; and learning means for learning internal parameters for the adjusting means in accordance with response time taken for the control target from input of the operating amount from the operating means to the control target to appearance of an influence of the operating amount on the control amount, transmission dead time taken for the control amount measured by the control target to be supplied to the adjusting means through a transmitting means and observation data stored in the observation data storing means.

Another third control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; transmission dead time measuring means for measuring transmission dead time taken for a transmitting means in accordance with the control amount measured by the control target and the control amount supplied to the adjusting means through the transmitting means; and learning means for learning internal parameters for the adjusting means in accordance with the transmission dead time measured by the transmission dead time measuring means, response time of the control target taken from input of the operating amount from the operating means to the control target to appearance of an influence of the operating amount on the control amount and observation data stored in the observation data storing means.

In the third control apparatus, (1) The adjusting means has virtual operating amount calculating means for calculating a virtual operating amount in accordance with the control amount measured by the control target and the target control amount; control amount predicting means for predicting a control amount after the response time has elapsed in accordance with the control amount measured by the control target and the virtual operating amount; operating amount correcting means for correcting the virtual operating amount in accordance with the predicted control amount after the response time has elapsed which has been predicted by the control amount predicting means and the target control amount; and means for supplying, to the operating means, a virtual operating amount as an adjustment signal, the virtual operating amount being obtained by, at least once, performing prediction of the control amount performed by the control amount predicting means and correction of the virtual operating amount performed by the operating amount correcting means.

(2) The control amount predicting means includes a neural circuit model; calculations in the operating amount correcting means is performed by error back propagation calculations of the neural circuit model; and the learning means generates learning data in accordance with the response time, the transmission dead time and observation data stored in the observation data storing means so as to perform leaning of the neural circuit model forming the control amount predicting means.

(3) The learning means performs learning such that observation data having the control amount before the transmission dead time and the operating amount at the present time is used as an input signal and the control amount after the response time has elapsed is used as a teacher signal when learning data is generated in accordance with the observation data stored in the observation data storing means.

A fourth control apparatus according to the present invention for controlling a control amount of a control target by changing an operating amount which is supplied to the control target, comprises: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; and learning means for learning internal parameters for the adjusting means in accordance with the response time of the control target taken from input of the operating amount from the operating means to the control target to appearance of an influence of the operating amount on the control amount, the transmission dead time taken for the control amount measured by the control target to be supplied to the adjusting means through a transmitting means and the operation delay time taken for the adjustment signal calculated by the adjusting means to appear as the operating amount through the operating means and observation data stored in the observation data storing means.

Another fourth control apparatus according to the present invention for controlling a control amount of a control target by changing an operating amount which is supplied to the control target, comprising: adjusting means for calculating an adjustment signal in accordance with the control amount measured by the control target and a target control amount; operating means for transmitting an operating amount to the control target in accordance with the adjustment signal calculated by the adjusting means; observation data storing means for storing observation data having control amounts and operating amounts observed previously; operation delay time measuring means for measuring operation delay time taken for the adjustment signal calculated by the adjusting means to appear as the operating amount through the operating means in accordance with the adjustment signal calculated by the adjusting means and the operating amount transmitted from the operating means; transmission dead time measuring means for measuring transmission dead time taken for a transmitting means in accordance with the control amount measured by the control target and the control amount supplied to the adjusting means through the transmitting means; and learning means for learning internal parameters for the adjusting means in accordance with the operation delay time measured by the operation delay time measuring means, the transmission dead time measured by the transmission dead time measuring means, response time of the control target taken from input of the operating amount from the operating means to the control target to appearance of an influence of the operating amount on the control amount and observation data stored in the observation data storing means.

In the fourth control apparatus, (1) The adjusting means has virtual operating amount calculating means for calculating a virtual operating amount in accordance with the control amount measured by the control target and the target control amount; control amount predicting means for predicting a control amount after the response time has elapsed in accordance with the control amount measured by the control target and the virtual operating amount; operating amount correcting means for correcting the virtual operating amount in accordance with the predicted control amount after the response time has elapsed which has been predicted by the control amount predicting means and the target control amount; and means for supplying, to the operating means, a virtual operating amount as an adjustment signal, the virtual operating amount being obtained by, at least once, performing prediction of the control amount performed by the control amount predicting means and correction of the virtual operating amount performed by the operating amount correcting means.

(2) The control amount predicting means includes a neural circuit model; calculations in the operating amount correcting means is performed by error back propagation calculations of the neural circuit model; and the learning means generates learning data in accordance with the response time, the operation delay time, the transmission dead time and observation data stored in the observation data storing means so as to perform leaning of the neural circuit model forming the control amount predicting means.

(3) The learning means performs learning such that observation data having the control amount before the transmission dead time and the operating amount after the operation delay time is used as an input signal and the control amount after the response time has elapsed is used as a teacher signal when learning data is generated in accordance with the observation data stored in the observation data storing means.

As described above, according to the present invention, the time factors existing in the loop for use in feedback control are considered so that control is furthermore accurately performed.

Since the learning section performs learning in consideration of response time taken from input of an operating amount to the control target to appearance of influence of the operating amount on the control amount, control can furthermore accurately be performed.

In a case where the operating section involves a time delay, observation data does not include an adjusting signal but the same includes an operating amount to be supplied to a control target and a control amount measured by the control target, the operation delay time involved in the operating section is measured, and the operating amount to be supplied to the control target after the operation delay time has elapsed is used as an input signal of the control amount of learned data so that the control amount predicting section predicts the control amount in a case where the supplied operating amount is supplied to the control target after the operation delay time has elapsed. Therefore, control can accurately be performed without an influence of the delay time occurring when the control is performed.

In a case where a time delay takes place when a value measured by the control target is transmitted to the adjusting section, transmission dead-time involved in the transmission is measured and the control amount measured before the transmission dead-time is used as the input signal of the control amount of learned data. As a result, the section for predicting the control amount predicts the control amount in accordance with the control amount and the operating amount measured before the transmission dead-time and supplied to the control amount predicting section after the delay time involved in the transmission has elapsed. Therefore, control can accurately be performed without the influence of the transmission time delay involved in transmission.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing a control apparatus according to a first embodiment of the present invention;

FIG. 2 is a diagram showing the detailed structure of an example of the adjusting section shown in FIG. 1;

FIG. 3 is a diagram showing an example of the structure which is employed when the control amount predicting section shown in FIG. 2 is composed of a neural circuit model;

FIG. 4 is a view of explanatory showing learning of a neural circuit model;

FIG. 5 is a block diagram showing a structure provided with a response time calculating section for calculating response time of the control target;

FIG. 6 is a block diagram showing a control apparatus according to a second embodiment of the present invention in which operation delay of the operating section is considered;

FIG. 7 is a diagram showing an example of the structure of an adjusting section shown in FIG. 6;

FIG. 8 is a diagram showing an example of the structure which is employed in a case where the control amount predicting section shown in FIG. 7 comprises a neural circuit model;

FIG. 9 is a view of explanatory showing learning of a neural circuit model shown in FIG. 8;

FIG. 10 is a block diagram showing a control apparatus according to a third embodiment of the present invention which is employed in a case where an operation delay time measuring section for measuring operation delay time of the operating section is provided;

FIG. 11 is a block diagram showing a control apparatus according to a fourth embodiment of the present invention which is employed in a case where the transmission delay time of the transmission section is considered;

FIG. 12 is a diagram showing an example of the structure of the adjusting section shown in FIG. 11;

FIG. 13 is a diagram showing an example of the structure which is employed in a case where the control amount predicting section shown in FIG. 12 comprises a neural circuit model;

FIG. 14 is a diagram showing learning of a neural circuit model shown in FIG. 13;

FIG. 15 is a block diagram showing a control apparatus according to a fifth embodiment of the present invention provided with a transmission dead-time measuring section for measuring transmission dead-time involved in the transmission section;

FIG. 16 is a block diagram showing a control apparatus according to a sixth embodiment of the present invention which is employed in a case where the operation delay time in the operating section and the transmission dead-time involved in the transmission section are considered;

FIG. 17 is a detailed diagram showing an example of the structure of the adjusting section shown in FIG. 16;

FIG. 18 is a diagram showing an example of the structure which is employed in a case where the control amount predicting section shown in FIG. 17 comprises a neural circuit model;

FIG. 19 is a diagram showing learning of a neural circuit model shown in FIG. 18;

FIG. 20 is a block diagram of a control apparatus according to a seventh embodiment of the present invention provided with an operation delay time measuring section for measuring operation delay time in the operating section and the transmission dead-time measuring section for measuring transmission dead-time involved in the transmission:

FIG. 21 is a block diagram showing an embodiment in which the present invention is applied to control dissolved oxygen density in a sewage-treatment process;

FIG. 25 is a flow chart of explanatory showing the calculation procedure in the control apparatus; and FIG. 26 is a diagram showing learning of a neural circuit model shown in FIG. 23.

DETAILED DESCRIPTION OF THE PREFERRED EMBODIMENTS

Figure 22:
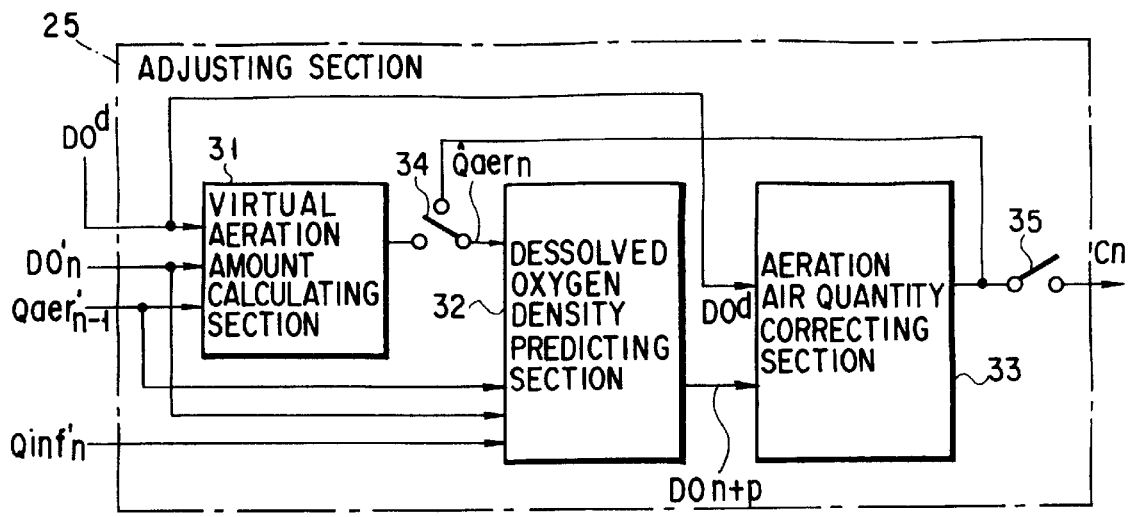
FIG. 22 is a detailed diagram showing an example of the structure of the adjusting section shown in FIG. 21.

FIG. 1 is a block diagram showing a control apparatus according to a first embodiment of the present invention, in which the flow of a signal at time $n\Delta t$.

As indicated by thick lines shown in FIG. 1, the control apparatus according to this embodiment includes a control target 1, an adjusting section 2 and a operating section 3 forming a feedback control loop. A learning section 4 and an observation data storing section 5 adjust the parameter in the adjusting section 2 as a result of learning.

The control target 1 is supplied with the operating amount at each unit time Δt so that the control amount is measured. The control amount $X_n$ measured by the control target 1 is supplied to the adjusting section 2. The adjusting section 2 calculates adjustment signal $C_n$ in accordance with the control amount $X_n$ measured by the control target 1 and required control amount $X^d$ set previously. The operating section 3 transmits operating amount $U_n$ in response to the adjustment signal $C_n$ calculated by the adjusting section 2. The control target 1 is supplied with the operating amount $U_n$ transmitted from the operating section 3 so as to be controlled because the operating amount $U_n$ is changed. A suffix of a symbol indicates time and, therefore, $X_n$ indicates the control amount measured from time (n−1) Δt to time nΔt. Hereinafter, the foregoing control amount is called as control amount at time nΔt and the suffix is used to similarly indicate time.

The learning section 4 adjusts the parameter W in the adjusting section 2 by learning in accordance with measured data consisting of response time pΔt taken from input of the control amount to the control target 1 to appearance of the control amount ($X_{n-l}$, $X_{n-l+1}$, ..., $X_{n-1}$) measured in previous unit time and stored in the observation data storing section 5 and the operating amount ($U_{n-l}$, $U_{n-l+1}$, ..., $U_{n-1}$)(where l is a positive integer) supplied to the control target 1, the adjusted parameter W being transmitted to the adjusting section 2. As a result, the present invention enables the adjusting section 2 to be capable of adapting to moderate change in the characteristics of a control target 1 which affects the control amount. The response time pΔt may be set such that time taken from input of the operating amount to the control target 1 to appearance of the influence of the operating amount on the control amount is previously measured or calculated, or may be dynamically set in accordance with change in the control target 1 as described later.

FIG. 2 is a diagram showing an example of the structure of the adjusting section 2.

As shown in FIG. 2, a virtual operating amount calculating section 6 calculates virtual operating amount $\hat{U}_n$ in accordance with the control amount $X_n$ and the required control amount $X^d$ measured by the control target 1. A control amount predicting section 7 calculates predicted control amount $\tilde{X}_{n+p}$ after time pΔt has elapsed in a case where the virtual operating amount $\hat{U}_n$ has been transmitted as an adjustment signal in accordance with the virtual operating amount $\hat{U}_n$ and the control amount $X_n$ measured by the control target 1. Note that pΔt is the response time of the control target 1. In accordance with required control amount $X^d$ of an operating amount correcting section, the virtual operating amount $\hat{U}_n$ is corrected in accordance with the predicted control amount $\tilde{X}_{n+p}$ to cause the predicted control amount $X_{n+p}$ to approximate the required control amount $X^d$. A first switch 9 is closed downwards when the control amount has been measured by the control target 1 to supply the virtual operating amount $\hat{U}_n$ calculated by the virtual operating amount calculating section 6 to the control amount predicting section 7. Then, the first switch 9 is closed upwards until a next measurement is performed. Thus, the prediction of the control amount performed by the control amount predicting section 7 and the correction of the operating amount performed by the control amount correcting section 8 are repeated by a predetermined number of times or until the difference from the predicted control amount $\tilde{X}_{n+p}$ to the required control amount $X^d$ is made to be a value smaller than a predetermined value, the repetition being performed such that the virtual operating amount $\hat{U}_n$ corrected by the virtual operating amount calculating section 6 is used as a n input to the control amount predicting section 7. When the prediction of the control amount performed by the control amount predicting section 7 and the correction of the operating amount performed by the control amount correcting section 8 have been repeated by a predetermined number of times or until the difference from the predicted control amount $\tilde{X}_{n+p}$ to the required control amount $X^d$ is made to be a value smaller than a predetermined value, the second switch 10 is closed so that the virtual operating amount $\hat{U}_n$ is, as adjustment signal $C_n$, transmitted to the operating section 3. As a result, even if the state of the control target 1 which affects the control amount $X_n$ is rapidly changed, the present invention enables the operating amount $U_n$ to accurately be corrected. As a result, the control amount $X_n$ can be controlled to approximate the required control amount $X_d$.

FIG. 3 is a diagram showing an example of the structure of the control amount predicting section 7. In this embodiment, the control amount predicting section 7 comprises a neural circuit model. FIG. 3 shows a flow of predicting signal for use in a control operation which is performed by the neutron circuit model 11 such that input of virtual operating amount $\hat{U}_n = (\hat{U}1_n, \hat{U}2_n, ..., \hat{U}g_n)^T$ at time nΔt (where g is the number of dimension of the control amount) and the control amount $X_n = (X1_n, X2_n, ..., xh_n)^T$ (where h is the number of dimension of the control amount) causes the predicted control amount $\tilde{X}_{n+p} = (\tilde{X}1_{n+p}, \tilde{X}2_{n+p}, ..., \tilde{X}h_{n+p})^T$ to be transmitted after the response time pΔt has elapsed. The output signal is obtained from the input signal by a forward calculation of the neutron circuit model 11. The forward calculation of the neutron circuit model 11 will be described later.

In the case where the control amount predicting section 7 comprises the neutron circuit model 11, the control amount correcting section 8 obtains a correction amount of the virtual operating amount $\hat{U}_n$ by performing an error back propagation calculation of the neutron circuit model 11 so as to correct the virtual operating amount. The error back propagation calculation of the neutron circuit model 11 will be described later together with the forward calculation.

In the case where the control amount predicting section 7 comprises the neutron circuit model 11, the learning section 4 is structured as follows.

The learning section 4 generates learning data in accordance with observation data composed of the response time pΔt taken for the influence of the operating amount for the control target 1 to appear on the control amount and previous control amount and the operating amount stored in the observation data storing section 5 to learn the neutron circuit model 11 forming the control amount predicting section 7. In the case where the neutron circuit model 11, as shown in FIG. 3, has a structure such that input of the control amount at present time and the virtual operating amount causes the control amount after the response time pΔt to be transmitted, learning is performed by using learning data consisting of the input signal ($U_s$, $X_s$) and the teacher signal ($X_{s+p}$) (s=n−l, n−l+1, ..., n−p−1).

Then, the forward calculation, the error back propagation calculation and the learning calculation will now be described.

The forward calculation is a calculation for obtaining an output signal when an input signal is supplied to the neural circuit model. On the basis of a triple-layered neural circuit model shown in FIG. 3, the forward calculation will now be described. Referring to FIG. 3, circles indicate nerve cell models called units, and segments binding the units are bonds for transmitting signals among the units. The units consists of input layers, intermediate layers and output layers which are arranged from the left to the right. Bonds are established between the units of the input layers and those of the intermediate layers and between the units of the intermediate layers and those of the output layers. The bonds have a directional property in transmitting signals so that signals are transmitted in only one direction from the input layer units to the intermediate layers and that from the intermediate layers to the output layers.

The input layer units are supplied with the input signals from outside such that one signal is supplied to one unit. In the control target shown in FIG. 3, virtual operating amount $\hat{U}_n=(\hat{U}1_n, \hat{U}2_n, \ldots, \hat{U}g_n)^T$ and control amount $X_n=(X1_n, X2_n, \ldots, xh_n)^T$ are supplied such that one signal is supplied to one unit. Assuming that $xi_1$ is an input value for the i-th unit of the input layer, $$xi_1 = \hat{U}1_n$$

$$xi_2 = \hat{U}2_n$$

$$\vdots$$

$$xi_g = \hat{U}g_n$$

$$xi_{g+1} = X1_n$$

$$xi_{g+2} = X2_n$$

$$\vdots$$

$$xi_{g+h} = Xh_n$$

The input/output function of the input layer is made to be an identity function. Output value $yi_i$ (I=1, 2, ..., Ni) of the input layer unit is expressed as follows:

$$yi_i = xi_i (i=1, 2, \ldots, Ni)$$

where Ni is the number of the input layer units (Ni=g+h).

The input value to the intermediate layer unit is a value obtained by subtracting a threshold of the intermediate layer unit from the sum obtained by weighting the output value of the input layer unit with a bond load value between the input layer and intermediate layer.

$$xh_j = \sum_{i=1}^{Ni} (w1_{j,i} * yi_i) - thh_j (j=1, 2, \ldots, Nh)$$

where $xh_j$ is an input value for the j-th unit of the intermediate layer, $w1_{j,i}$ is the bond load value between the first unit of the input layer and the j-th unit of the intermediate layer, $thh_j$ is a threshold of the j-th unit of the intermediate layer and Nh is the number of units in the intermediate layer.

Assuming that the input/output function of the intermediate layer unit is in the form of a sigmoid function below:

$$f(x) = \frac{2}{1 + \exp(-x)} - 1$$

output value $yh_j$ of the j-th unit of the intermediate layer can be expressed as follows by using input value $xh_j$:

$$yh_{j=f(xhj)} (j=1, 2, \ldots, Nh)$$

The input value of the output layer unit is a value obtained by subtracting a threshold of the output layer unit from the sum obtained by weighting the output value of the intermediate layer unit with a bond load value between the intermediate layer and output layer.

$$xo_k = \sum_{j=1}^{Nh} (w2_{k,j} * yh_j) - tho_k (k=1, 2, \ldots, No)$$

where $xo_k$ is an input value of the k-th unit of the output layer, $w2_{k,j}$ is a bond load value between the j-th unit of the intermediate layer and the k-th unit of the output layer, $tho_k$ is a threshold of the k-th unit of the output layer and No is the number of units in the output layer. The input/output function of the output layer is made to be an identity function.

$$yo_k = xo_k (k=1, 2, \ldots, No)$$

An output signal from the foregoing output layer unit is transmitted to the outside. In the case shown in FIG. 3, predicted value $\tilde{X}_{n+p}=(\tilde{X}1_{n+p}, \tilde{X}2_{n+p}, \ldots, \tilde{X}h_{n+p})^T$ at time $(n+p)\Delta t$.

$$\tilde{X}1_{n+p} = yo_1$$

$$\tilde{X}2_{n+p} = yo_2$$

$$\vdots$$

$$\tilde{X}h_{n+p} = yo_h$$

The forward calculation of the neutron circuit model 11 is structured as described.

Then, the error back propagation calculation of the neural circuit model will now be described.

When the control amount $\tilde{X}_{n+p}$ predicted by the control amount predicting section 7 and the required control amount $X^d$ are supplied to the control amount correcting section 8, the control amount correcting section 8 calculates a corrected amount of the virtual operating amount $\hat{U}_n$. As a result, the virtual operating amount $\hat{U}_n$ is corrected. In the case where the control amount predicting section 7 comprises the neutron circuit model 11, the corrected amount of the virtual operating amount $\hat{U}_n$ can be calculated by the error back propagation calculation of the neutron circuit model 11.

Then, an error function is defined in accordance with an output signal from the neural circuit model and a required output signal. In the case shown in FIG. 3, the error between the predicted control amount $\tilde{X}1_{n+p}$ calculated by the forward calculation of the neutron circuit model 11 performed by the control amount predicting section 7 and the required control amount $\tilde{X}^{d=(X}1d, X2d, xhd)^T$ is used to define the error function E as follows:

$$E = \frac{1}{2} (\tilde{X}_{n+p} - X^d)^T (\tilde{X}_{n+p} - X^d)$$

Correction amounts of the output values from the units for reducing the error function are sequentially obtained for each layer from the output layer to the input layer so that the correction amount of the input signal is finally obtained. Initially, the correction amount of the output value from the output layer unit is calculated by using positive constant h as follows:

$$\Delta yo_k = -\eta \frac{\partial E}{\partial yo_k}$$

$$= -\eta(\tilde{X}n+p-Xk^d)(k=1,2,\ldots,No)$$

Then, the correction amount of the output value from the intermediate layer is expressed as follows by using the correction amount of the output layer unit:

$$\Delta yh_j = \sum_{k=1}^{No} \frac{dyo_k}{dxo_k} \frac{\partial xo_k}{\partial yh_j} \Delta yo_k$$

$$= \sum_{k=1}^{No} w2_{kj}\Delta yo_k \, (j=1,2,\ldots,Nh)$$

Then, the correction amount of the output value from the intermediate layer is expressed as follows by using the correction amount of the intermediate layer unit:

$$\Delta yi_i = \sum_{j=1}^{Nh} \frac{dyh_j}{dxh_j} \frac{\partial xh_j}{\partial yi_i} \Delta yh_j$$

$$= \sum_{j=1}^{Nh} f'(xh_j)w1_{j,i}\Delta yh_j$$

where f' (x) indicates a derived function of the sigmoid function f (x) which is specifically expressed as follows:

$$f'(x) = \frac{1}{2} (1+f(x))(1-f(x))$$

Since the input/output function of the input layer unit is a identity function, the correction amount of the output value is made to be the correction amount of the input signal as it is.

In the case where the neural circuit model is structured as shown in FIG. 3, the correction amount $\Delta U_n$ of the virtual operating amount $\hat{U}_n$, which is the input signal, is expressed as follows:

$\Delta \hat{U}_n = (\Delta \hat{U}1_n, \Delta \hat{U}2_n, \ldots, \Delta \hat{U}g_n)$ $\Delta \hat{U}i_n = \Delta yi_i (i=1,2,\ldots, g)$ The thus-obtained correction amount is added to the virtual operating amount $\hat{U}_n$.

As described above, error back propagation calculation and the calculation of the virtual operating amount obtained by the foregoing calculation are defined.

Then, the learning calculation of the neural circuit model will now be described with reference to FIG. 4.

Referring to FIG. 4, reference numeral 5 represents a observation data storing section, reference numeral 11 represents a neutron circuit model, reference numeral 12 represents a subtractor, reference numeral 13 represents an error back propagation learning section, reference numeral 14 represents an arrow indicating an operation in which an output from the input layer of the neutron circuit model 11 is supplied to the error back propagation learning section 13, reference numeral 15 represents an arrow indicating an operation in which an output from the intermediate layer of the neutron circuit model 11 is supplied to the error back propagation learning section 13, reference numeral 16 represents an arrow indicating an operation in which a bond load value between the intermediate layer and the output layer of the neutron circuit model 11 is supplied to the error back propagation learning section 13, reference numeral 17 represents an arrow indicating an operation in which the bond load value between the input layer and the intermediate layer calculated by the error back propagation learning section 13 and the calculation amount of the threshold of the intermediate layer are transmitted to each bond load and the intermediate layer unit to correct each bond load value and the threshold and reference numeral 18 represents an arrow indicating an operation in which the bond load value between the intermediate layer and the output layer calculated by the error back propagation learning section 13 and the correction amount of the threshold of the output layer unit are transmitted to each bond load and the output layer unit to correct each bond load value and the threshold.

The correction amount Us and the control amount Xs at time $s\Delta t$ of previous time $s\Delta t$ (s=n−l, n−l+1, ..., n−p−1) are, as input signals, transmitted from the observation data storing section 5 to the neutron circuit model 11. In the neutron circuit model 11, the forward calculation is performed by using the operating amount $U_s$ at time $s\Delta t$ and the control amount $X_s$ so as to transmit output signal $\tilde{X}_{s+p}$. In the subtractor 12, the difference $X_{s+p}$ between the control amount $X_{s+p}$ after the response time has elapsed which has been transmitted as the teacher signal from the observation data storing section 5 and the output is $\tilde{X}_{s+p}$ from the neutron circuit model 11 is calculated so as to be transmitted to the error back propagation learning section 13. The error back propagation learning section 13 is supplied with, in addition to the foregoing difference, each output value from the input layer of the neural circuit model 11, each output value from the intermediate unit and each bond load value between the intermediate layer and the output layer so that calculation values of the bond load value and the threshold are calculated.

In the error back propagation learning section 13, the error function E is defined as follows in accordance with the difference between the teacher signal $X_{s+p}$ and the output signal $X_{s+p}$ from the neutron circuit model 11:

$$E = \frac{1}{2} \sum_{s=n-l}^{n-p-1} (X_{s+p} - \tilde{X}_{s+p})^T (X_{s+p} - \tilde{X}_{s+p})$$

In accordance with the error back propagation learning method, the calculation amount of the bond load value and the threshold of the neutron circuit model 11 are calculated as follows:

$$\Delta w2_{k,j} = -\in \frac{\partial E}{\partial w2_{k,j}}$$

$$= -\in \sum_{s=n-l}^{n-p-1} \frac{\partial E}{\partial yo_k^s} \frac{dyo_k^s}{dxo_k^s} \frac{\partial xo_k^s}{\partial w2_{k,j}}$$

$$= -\in \sum_{s=n-l}^{n-p-1} (\tilde{X}_{s+p} - X_{s+p})yh_j^s$$

$$(j=1,2,\ldots,Nh; k=1,2,\ldots,No)$$

$$\Delta tho_k = -\in \frac{\partial E}{\partial tho_k}$$

$$= -\in \sum_{s=n-l}^{n-p-1} \frac{\partial E}{\partial yo_k^s} \frac{dyo_k^s}{dxo_k^s} \frac{\partial xo_k^s}{\partial tho_k}$$

$$= \in \sum_{s=n-l}^{n-p-1} (\tilde{X}_{s+p} - X_{s+p}) \, (k=1,2,\ldots,No)$$

-continued $$\Delta w1_{j,i} = -\in \frac{\partial E}{\partial w1_{j,i}}$$

$$= -\in \sum_{s=n-l}^{n-p-1} \sum_{k=1}^{No} \frac{\partial E}{\partial yo_k^s} \frac{dyo_k^s}{dxo_k^s} \frac{\partial xo_k^s}{\partial yh_j^s}$$

$$\frac{dyh_j^s}{dxh_j^s} \frac{\partial xh_j^s}{\partial w1_{j,i}}$$

$$= -\in \sum_{s=n-l}^{n-p-1} \sum_{k=1}^{No} (\tilde{X}_{s+p} - X_{s+p}) w2_{k,j} f'(xh_j^s) yi_i^s$$

$$(i = 1, 2, \ldots, Ni; j = 1, 2, \ldots, Nh)$$

$$\Delta thh_j = -\in \frac{\partial E}{\partial thh_j}$$

$$= -\in \sum_{s=n-l}^{n-p-1} \sum_{k=1}^{No} \frac{\partial E}{\partial yo_k^s} \frac{dyo_k^s}{dxo_k^s} \frac{\partial xo_k^s}{\partial yh_j^s}$$

$$\frac{dyh_j^s}{dxh_j^s} \frac{\partial xh_j^s}{\partial thh_j}$$

$$= \in \sum_{s=n-l}^{n-p-1} \sum_{k=1}^{No} (\tilde{X}_{s+p} - X_{s+p}) w2_{k,j} f'(xh_j^s)$$

$$(j = 1, 2, \ldots, Nh)$$

where $\Delta w2_{k,j}$ is a calculation amount of the bond load value $w2_{k,j}$ between the j-th unit of the intermediate layer and the k-th unit of the output layer, $\Delta tho_k$ is a calculation amount of the threshold $tho_k$ of the k-th unit of the output layer, $\Delta w1_{j,i}$ is a corrected amount of the bond load between the j-th unit of the input layer and the j-th unit of the intermediate layer, $\Delta thh_j$ is a corrected amount of the threshold $thh_j$ of the j-th unit of the intermediate layer, $yo_k^s$ is an output value from the k-th unit of the output layer when data at time $s\Delta t$ has been supplied, $xo_k^s$ is an input value of the k-th unit of the output layer, $yh_j^s$ is an output value of the j-th unit of the intermediate layer when data at time $s\Delta t$ has been supplied and $xh_j^s$ is an output value of the first unit of the intermediate layer when data at time $s\Delta t$ has been supplied. On the basis of the above-mentioned correction amounts, the bond load value and the threshold are corrected.

Another embodiment of the Present invention will now be described with reference to FIG. 5.

In the control apparatus shown in FIG. 5, a response time calculating section is added to the control apparatus shown in FIG. 1. The response time calculating section 19 calculates the response time of the control target 1. The response time calculating section 19 calculates the response time of the control target 1 which takes for the influence of the operating amount supplied to the control target 1 to appear on the control amount in accordance with the time sequence $U=(U_{n-m}, U_{n-m+1}, \ldots, U_{n-1})$ of the operating amount supplied to the control target 1 for the previous unit time m and time sequence $(X_{n-m}, X_{n-m+1}, \ldots, X_{n-1})$ of the control amount to transmit a result of the calculation to the learning section 4 (where m is a positive integer).

A second embodiment of the present invention will now be described with reference to FIG. 6.

A control apparatus shown in FIG. 6 is structured in consideration of a fact that the adjusting section 2 involves time delay. As shown in FIG. 6, the control amount $X_n$ measured by the control target 1 is supplied to the adjusting section 2. The adjusting section 2 calculates the adjustment signal $C_n$ in accordance with the control amount $X_n$ and the required control amount $X^d$ measured by the control target 1. The operating section 3 transmits the operating amount $U_n$ in accordance with the adjustment signal $C_n$ calculated by the adjusting section 2. Since the operating section 3 has the operation delay time, the supplied adjustment is delayed for a predetermined operation delay time so as to be transmitted as the operating amount. The control target 1 is supplied with the operating amount $U_n$ transmitted from the operating section 3. Since the operating amount $U_n$ is changed, the control target 1 is controlled.

The learning section 4 performs learning to adjust the parameter W of the adjusting section 2 in accordance with observation data composed of the response time $p\Delta t$ taken from input of the operating amount to the control target 1 to appearance of the influence of the operating amount on the control amount, operation delay time $q\Delta t$ taken for the adjustment signal calculated by the adjusting section 2 to appear as the operating amount through the operating section 3, the control amount stored in the observation data storing section 5 and measured for the previous one unit time $(X_{n-l}, X_{n-l+1}, \ldots, X_{n-1})$ and the operating amount $(U_{n-l}, U_{n-l+1}, \ldots, U_{n-1})$ supplied to the control target 1. Thus, the learning section 4 transmit the parameter W to the adjusting section 2. The operation delay time $q\Delta t$ may be the time taken for the adjustment signal calculated by the adjusting section 2 to appear as the operating amount through the operating section 3 and obtained by previous measurement of calculation, similarly to the response time $p\Delta t$. As an alternative to this, the operation delay time $q\Delta t$ may dynamically be set to correspond to the change in the adjusting section 2.

FIG. 7 is a diagram showing an example of the structure of the adjusting section 2 shown in FIG. 6.

As shown in FIG. 7, the virtual operating amount calculating section 6 calculates the virtual operating amount $\hat{U}_n$ in accordance with the control amount $X_n$ measured by the control target 1 and the required control amount $X^d$. The control amount predicting section 7 calculates predicted control amount $\tilde{X}_{n+p}$ after time $p\Delta t$ has elapsed in the case where the virtual operating amount $\hat{U}_n$ has been transmitted as the adjustment signal in accordance with the virtual operating amount $\hat{U}_n$ and the control amount $\tilde{X}_n$ measured by the control target 1. Note that $p\Delta t$ is the response time of the control target 1. The control amount correcting section 8 corrects the virtual operating amount $\hat{U}_n$ to cause the predicted control amount $\tilde{X}_{n+p}$ to approximate the required control amount $X^d$ in accordance with the control amount $X_{n+p}$ after time $p\Delta t$ has elapsed which has been predicted by the control amount predicting section 7 and the required control amount $X^d$. The first switch 9 is closed downwards when the control amount has been measured by the control target 1 so that the virtual operating amount $\hat{U}_n$ calculated by the virtual operating amount calculating section 6 is supplied to the control amount predicting section 7. Then, the first switch 9 is closed upwards until a next measurement is performed. Thus, the virtual operating amount $\hat{U}_n$ calculated by the control amount correcting section 8 is supplied to the control amount predicting section 7. Thus, the prediction of the control amount performed by the control amount predicting section 7 and the correction of the operating amount performed by the control amount correcting section 8 are repeated by a predetermined number of times or until the difference from the predicted control amount $\tilde{X}_{n+p}$ and the required control amount $X^d$ is made to be a value smaller than a predetermined value. When the prediction of the control amount performed by the control amount predicting section 7 and the correction of the operating amount performed by the control amount correcting section 8 have been repeated by a predetermined number of times or until the difference from the virtual operating amount $\tilde{X}_{n+p}$ and the required control amount $X^d$ is made to be a value smaller than a predetermined value, the second switch 10 is closed so that the virtual operating amount $\hat{U}_n$ is, as adjustment signal $C_n$, transmitted to the operating section 3.

FIG. 8 is a diagram showing an example of the structure of the control amount predicting section 7. Also in this example, the control amount predicting section 7 comprises a neural circuit model 11. FIG. 8 shows a flow of signals in the predicting calculations in a control operation which is performed by the neutron circuit model 11 such that input of virtual operating amount $\hat{U}_n = (\hat{U}1_n, \hat{U}2_n, \ldots, \hat{U}g_n)^T$ at time $n\Delta t$ (where g is the number of dimension of the control amount) and the control amount $X_n = (X1_n, X2_n, \ldots, xh_n)^T$ (where h is the number of dimension of the control amount) causes the predicted control amount $\tilde{X}_{n+p} = (\tilde{X}1_{n+p}, \tilde{X}2_{n+p}, \ldots, \tilde{X}h_{n+p})^T$ to be transmitted after the response time $p\Delta t$ has elapsed. The output signal is obtained from the input signal by the above-mentioned forward calculation of the neutron circuit model 11.

In the case where the control amount predicting section 7 comprises the neutron circuit model 11, the control amount correcting section 8 obtains a correction amount of the virtual operating amount $\hat{U}_n$ by performing an error back propagation calculation of the neutron circuit model 11 so as to correct the virtual operating amount.

In the case where the control amount predicting section 7 comprises the neutron circuit model 11, the learning section 4 is structured as follows.

The learning section 4 generates learning data in accordance with observation data composed of the response time $p\Delta t$ of the control target 1, the operation delay time $q\Delta t$ and the previous control amount and the operating amount stored in the observation data storing section 5 to learn the neutron circuit model 11 forming the control amount predicting section 7.

The operating amount $U_s$ and the control amount $X_s$ at time $s\Delta t$ forming the observation data respectively are the operating amount supplied to the control target 1 at time $s\Delta t$ and the control amount measured by the control target 1 at time $s\Delta t$. Therefore, in the case where the operating section 3 involves time delay, learning by using the input signal ($U_s$, $X_s$) and the teacher signal ($X_{s+p}$) (s=n-1, n-l+1, ..., n-p-1) causes the neutron circuit model 11 to transmit the control amount $X_s$ after time $p\Delta t$ has elapsed in accordance with the control amount $X_s$ measured at time $s\Delta t$ and the operating amount $U_s$ supplied to the control target 1 at time $s\Delta t$. If control is performed by using the neutron circuit model 11 to serve as the control amount predicting section 7, the adjusting section 2 unintentionally obtains the operating amount $U_s$ for causing the predicted control amount $\tilde{X}_{n+p}$ to approximate the required control amount $X^d$. Since the foregoing value is supplied to the control target 1 after the operation delay time $q\Delta t$ has elapsed, accurate control cannot be performed.

Accordingly, the present invention is, as shown in FIG. 9, structured such that learning data (s=n-l, n-l+1, ..., n-p-1) is generated in which control amount $X_s = (X1_s, X2_s, \ldots, xh_s)$ and the operating amount $U_s$, $q = (U1_{s+q}, U2_{s+q}, \ldots, Ug_{s+q})$ which is supplied to the control target 1 after the operation delay time $q\Delta t$ has elapsed are used as the input signals and the control amount $X_{s+p}$ (X1$_{s+p}$, X2$_{s+p}$, ..., Xh$_{s+p}$) after the response time $p\Delta t$ has elapsed is used as the teacher signal. If learning can be performed with the above-mentioned leaning data, the adjustment signal $C_n$ obtained by the adjusting section 2 when the control is performed is an operating amount which causes the control amount $X_{n+p}$ after the response time $p\Delta t$ has elapsed when the adjustment signal $C_n$ has been supplied to the control target 1 after the operation delay time $q\Delta t$ has elapsed. Therefore, accurate control can be performed.

A third embodiment of the present invention will now be described with reference to FIG. 10.

A control apparatus shown in FIG. 10 is additionally provided with an operation delay time measuring section 20. The operation delay time measuring section calculates $q\Delta t$ taken for the adjustment signal to be supplied to the operating section 3 and to be transmitted as the operating amount in accordance with the time sequence C ($C_{n-m}$, $C_{n-m+1}$, ..., $C_{n-1}$) of the adjustment signals calculated by the adjusting section 2 in the previous unit time m and the time sequence U=($U_{n-m}$, $U_{n-m+1}$, ..., $U_{n-1}$) of the operating amount transmitted from the operating section 3 so as to transmit the operation delay time $q\Delta t$ to the learning section 4. Note that m is a positive integer. Since the operation delay time measuring section 20 is added, the operation delay time measuring section 20 calculates operation delay time $q\Delta t$ even if the operation delay time $q\Delta t$ is changed attributable to change in the characteristics of the operating section 3 so that the operation delay time $q\Delta t$ is transmitted to the learning section 4. Since the learning section 4 generates learning data in accordance with the supplied operation delay time $q\Delta t$ to perform learning, control can accurately be continued even if the operation delay time is changed.

A fourth embodiment of the present invention will now be described with reference to FIG. 11.

A control apparatus shown in FIG. 11 is structured in consideration of existence of a transmission section involving dead time when the control amount measured by the control target 1 is transmitted to the adjusting section 2.

As shown in FIG. 11, the control amount $X_n$ measured by the control target 1 after time $n\Delta t$ has elapsed is supplied to the adjusting section 2 through a transmitting section 21. The transmitting section 21 involves a transmission dead time, thus causing the control amount $X_n$ measured by the control target 1 to be supplied to the adjusting section 2 after the transmission dead time has elapsed. The control amount which is supplied to the adjusting section 2 after time $n\Delta t$ has elapsed is expressed as $X'_n$. The adjusting section 2 calculates the adjustment signal $C_n$ in accordance with the control amount $X'_n$ and the required control amount $X^d$. The operating section 3 transmits the operating amount $U_n$ in accordance with the adjustment signal $C_n$ calculated by the adjusting section 2. The control target 1 is supplied with the operating amount $U_n$ transmitted from the operating section 3. Since the operating amount $U_n$ is changed, control is performed.

The learning section 4 performs learning to adjust the parameter W for the adjusting section 2 in accordance with observation data consisting of the response time $p\Delta t$ taken from input of the operating amount to the control target 1 to appearance of the influence of the operating amount on the control amount, the transmission dead time $r\Delta t$ involving for the control amount $X_n$ measured by the control target 1 to be supplied to the adjusting section 2 through the transmitting section 21, the control amount ($X_{n-l}$) $X_{n-l+1}$, ..., $X_{n-1}$) measured for previous unit time which has been stored in the observation data storing section 5 and the operating amount ($U_{n-l}$, $U_{n-l+1}$, ..., $U_{n-1}$) supplied to the control target 1, the parameter W being then supplied to the adjusting section 2. Similarly to the operation delay time $q\Delta t$ and the response time $p\Delta t$, the transmission dead time may be time taken for the control amount $X_n$ measured by the control target 1 to be supplied to the adjusting section 2 through the transmitting section 21 and previously measured or calculated. As an alternative to this, it may dynamically be set to correspond to change in the transmitting section 21, as described later.

FIG. 12 shows an example of the structure of the adjusting section 2 shown in FIG. 11.

An adjusting section 2 shown in FIG. 12 is different from the adjusting section 2 shown in FIG. 7 in that the control amount $X'_n$ which is supplied to the adjusting section 2 is delayed by the transmission dead time $r\Delta t$ from the control amount $X_n$ measured by the control target 1.

The virtual operating amount calculating section 6 calculates the virtual operating amount $U_n$ in accordance with the control amount $X'_n$ supplied through the transmitting section 21 and the required control amount $X^d$. The control amount predicting section 7 calculates predicted control amount $\tilde{X}_{n+p}$ after time $p\Delta t$ has elapsed in the case where the virtual operating amount $\hat{U}_n$ has been transmitted as the adjustment signal in accordance with the virtual operating amount $\hat{U}_n$ and the control amount $X'_n$ measured by the control target 1. Note that $p\Delta t$ is the response time of the control target 1. The control amount correcting section 8 corrects the virtual operating amount $\hat{U}_n$ to cause the predicted control amount $\tilde{X}_{s+p}$ to approximate the required control amount $X^d$ in accordance with the control amount $X_{n+p}$ after time $p\Delta t$ has elapsed which has been predicted by the control amount predicting section 7 and the required control amount $X^d$. The first switch 9 is closed downwards when the control amount has been measured by the control target 1 so that the virtual operating amount $\hat{U}_n$ calculated by the virtual operating amount calculating section 6 is supplied to the control amount predicting section 7. Then, the first switch 9 is closed upwards until a next measurement is performed. Thus, the virtual operating amount $\hat{U}_n$ corrected by the control amount correcting section 8 is supplied to the control amount predicting section 7. Thus, the prediction of the control amount performed by the control amount predicting section 7 and the correction of the operating amount performed by the control amount correcting section 8 are repeated by a predetermined number of times or until the difference from the predicted control amount $\tilde{X}_n$ and the required control amount $X^d$ is made to be a value smaller than a predetermined value. When the prediction of the control amount performed by the control amount predicting section 7 and the correction of the operating amount performed by the control amount correcting section 8 have been repeated by a predetermined number of times or until the difference from the predicted control amount $\tilde{X}_{n+p}$ and the required control amount $X^d$ is made to be a value smaller than a predetermined value, the second switch 10 is closed so that the virtual operating amount $\hat{U}_n$ is, as adjustment signal $C_n$, transmitted to the operating section 3.

FIG. 13 is a diagram showing an example of the structure of the control amount predicting section 7 shown in FIG. 12. Also in this case, the control amount predicting section 7 comprises a neural circuit model. FIG. 13 shows a flow of signals in the predicting calculations in a control operation which is performed by the neutron circuit model 11 such that input of virtual operating amount $\hat{U}_n=(\hat{U}1_n, \hat{U}2_n, \ldots, \hat{U}g_n)^T$ at time $n\Delta t$ (where g is the number of dimension of the control amount) and the control amount $X'_n=(X1'_n, X2'_n, \ldots, xh'_n)^T$ (where h is the number of dimension of the control amount) causes the predicted control amount $\tilde{X}_{n+p}=(X1_{n+p}, X2_{n+p}, \ldots, xh_{n+p})^T$ to be transmitted after the response time $p\Delta t$ has elapsed. The output signal is obtained from the input signal by the above-mentioned forward calculation of the neutron circuit model 11.

In the case where the control amount predicting section 7 comprises the neutron circuit model 11, the control amount correcting section 8 obtains a correction amount of the virtual operating amount $\hat{U}_n$ by performing an error back propagation calculation of the neutron circuit model 11 so as to correct the virtual operating amount.

In the case where the control amount predicting section 7 comprises the neutron circuit model 11, the learning section 4 is structured as follows.

The learning section 4 generates learning data in accordance with observation data composed of the response time $p\Delta t$ of the control target 1, the transmission dead time $r\Delta t$ and the previous control amount and the operating amount stored in the observation data storing section 5 to learn the neutron circuit model 11 forming the control amount predicting section 7. In the case where transmitting section 21 involves transmission dead time, learning by using the input signal $(U_s, X_s)$ and the teacher signal $(X_{s+p})$ (s=n-l, n-l+1, \ldots, n-p-1) causes the neutron circuit model 11 to transmit the control amount $X_{s+p}$ after time $p\Delta t$ has elapsed in accordance with the control amount $X_s$ measured at time $s\Delta t$ and the operating amount $U_s$ supplied to the control target 1 at time $s\Delta t$. If control is performed by using the neutron circuit model 11 to serve as the control amount predicting section 7, the control amount predicting section 7 unintentionally transmits the predicted control amount $\tilde{X}_{n+p}$ after time $p\Delta t$ is elapsed such that the control amount measured before the transmission dead time $r\Delta t$ is used as the present control amount. Therefore, accurate control cannot be performed.

Accordingly, the present invention is structured in such a manner that input of the control amount $X'_n$ and adjustment signal $C_n$ which is supplied to the adjusting section 2 at time $n\Delta t$ to the neutron circuit model 11 causes predicted control amount $\tilde{X}_{n+p}$ after time $p\Delta t$ has elapsed to be transmitted by using, as shown in FIG. 14, the control amount $X_{s-r}=(X1_{s-r}, X2_{s-r}, \ldots, Xh_{s-r})$ and the operating amount $Ur=(U1_{s-r}, U2_{s-r}, \ldots, Ug_s)$ measured by the control target 1 before the transmission dead time as input signals and the control amount $X_{s+p}$ $(X1_{s+p}, X_{s+p}, \ldots, xh_{s+p})$ as the teacher signal (s=n-l+r, n-l+r +1, \ldots, n-p-1). If learning can be performed with the above-mentioned leaning data, the adjustment signal $C_n$ obtained by the adjusting section 2 when the control is performed is an adjustment signal which causes the control amount $X_{n+p}$ after the response time $p\Delta t$ has elapsed which has been predicted from the control amount $X'_n$ measured by the control target 1 before the transmission dead time $r\Delta t$ and the adjustment signal $C_n$ to approximate the required control amount $X^d$. Therefore, accurate control can be performed.

A fifth embodiment of the present invention will now be described with reference to FIG. 15.

A control apparatus shown in FIG. 15 has a control target such that a transmission dead-time measuring section 22 is added to the control apparatus shown in FIG. 11. The transmission dead-time measuring section 22 calculates the transmission dead time $r\Delta t$ taken for the control amount measured by the control target 1 to be supplied to the adjusting section 2 in accordance with the time sequence X $(X_{n-m}, X_{n-m+1}, \ldots, X_{n-1})$ of the control amount measured by the control target 1 for the previous unit time m and time sequence $X'=(X_{n-m}, X'_{n-m+1}, \ldots, X'_{n-1})$ of the control amount supplied to the adjusting section 2, the calculated transmission dead time $r\Delta t$ being transmitted to the learning section 4. Note that m is a positive integer. Even if the transmission dead time is changed attributable to change in the characteristics of the transmitting section 21, the added transmission dead-time measuring section 22 calculates the transmission dead time $r\Delta t$ after the change has taken place so as to be transmitted to the learning section 4. The learning section 4 uses the transmission dead time $r\Delta t$ supplied from the transmission dead-time measuring section 22 to generate learning data and perform learning. Therefore, even if the transmission dead time is changed, control can accurately be continued.

A sixth embodiment of the present invention will now be described with reference to FIG. 16.

A control apparatus shown in FIG. 16 has an arrangement such that the operating section 3 is structured in consideration of a fact that dead time takes for the adjustment signal to be supplied to the control target 1 as the operating amount and the transmitting section 21 is structured in consideration of a fact that dead time takes for the control amount measured by the control target 1 to be transmitted to the adjusting section 2. As shown in FIG. 16, the control amount $X_n$ measured by the control target 1 at time $n\Delta t$ is supplied to the adjusting section 2 through the adjusting section 21. Since the transmitting section 21 has a transmission dead time $r\Delta t$, the control amount $X_n$ measured by the control target 1 is delayed by the transmission dead time $r\Delta t$ before it is supplied to the adjusting section 2. The control amount which is supplied to the adjusting section 2 at time $n\Delta t$ is expressed as $X'_n$. The adjusting section 2 calculates the adjustment signal $C_n$ in accordance with the control amount $X'_n$ and the required control amount $X^d$. The operating section 3 transmits the operating amount $U_n$ in accordance with the adjustment signal $C_n$ calculated by the adjusting section 2. Since the operating section 3 has the time delay, the supplied adjustment signal $C_n$ is transmitted as the operating amount after the operation delay time $q\Delta t$ has elapsed. The control target 1 is supplied with the operating amount $U_n$ transmitted from the operating section 3. Since the operating amount $U_n$ is changed, control can be performed.

The learning section 4 performs learning to adjust the parameter W for the adjusting section 2 in accordance with observation data consisting of the response time $p\Delta t$ taken from input of the operating amount to the control target 1 to appearance of the influence of the operating amount on the control amount, the operation delay time $q\Delta t$ taken for the adjustment signal calculated by the adjusting section 2 to appear as the operating amount through the operating section 3, the transmission dead time $r\Delta t$ taken for the control amount measured by the control target 1 to be supplied to the adjusting section 2 through the transmitting section 21, the control amount $(X_{n-l}, X_{n-l+1}, \ldots, X_{n-1})$ measured for the previous one unit time which has been stored in the observation data storing section 5 and the operating amount $(U_{n-l}, U_{n-l+1}, \ldots, U_{n-1})$ supplied to the control target 1, the parameter W being then supplied to the adjusting section 2.

FIG. 17 shows an example of the structure of the adjusting section 2 shown in FIG. 16.

As shown in FIG. 17, the virtual operating amount calculating section 6 calculates the virtual operating amount $\hat{U}_n$ in accordance with the control amount $X'_n$ supplied through the transmitting section 21 and the required control amount $X^d$. The control amount predicting section 7 calculates predicted control amount $\tilde{X}_{n+p}$ after time $p\Delta t$ has elapsed in the case where the virtual operating amount $\hat{U}_n$ has been transmitted as the adjustment signal in accordance with the virtual operating amount $\hat{U}_n$ and the control amount $X'_n$. Note that $p\Delta t$ is the response time of the control target 1. The control amount correcting section 8 corrects the virtual operating amount $\hat{U}_n$ to cause the predicted control amount $\tilde{X}_{n+p}$ to approximate the required control amount $X^d$ in accordance with the control amount $X_{n+p}$ after time $p\Delta t$ has elapsed which has been predicted by the control amount predicting section 7 and the required control amount $X^d$. The first switch 9 is closed downwards when the control amount has been measured by the control target 1 so that the virtual operating amount $\hat{U}_n$ calculated by the virtual operating amount calculating section 6 is supplied to the control amount predicting section 7. Then, the first switch 9 is closed upwards until the next measurement is performed. Thus, the virtual operating amount $\hat{U}_n$ corrected by the control amount correcting section 8 is supplied to the control amount predicting section 7. Thus, the prediction of the control amount performed by the control amount predicting section 7 and the correction of the operating amount performed by the control amount correcting section 8 are repeated by a predetermined number of times or until the difference from the predicted control amount $\tilde{X}_{n+p}$ and the required control amount $X^d$ is made to be a value smaller than a predetermined value. When the prediction of the control amount performed by the control amount predicting section 7 and the correction of the operating amount performed by the control amount correcting section 8 have been repeated by a predetermined number of times or until the difference from the predicted control amount $\tilde{X}_{n+p}$ and the required control amount $X^d$ is made to be a value smaller than a predetermined value, the second switch 10 is closed so that the virtual operating amount $\hat{U}_n$ is, as adjustment signal $C_n$, transmitted to the operating section 3.

FIG. 18 is a diagram showing an example of the structure of the control amount predicting section 7 shown in FIG. 17. Also in this case, the control amount predicting section 7 comprises a neural circuit model. FIG. 18 shows a flow of predicting signal for use in a control operation which is performed by the neutron circuit model 11 such that input of virtual operating amount $\hat{U}_n=(\hat{U}1_n, \hat{U}2_n, \ldots, \hat{U}g_n)^T$ at time $n\Delta t$ (where g is the number of dimension of the control amount) and the control amount $X'_n=(X1'_n, X2'_n, \ldots, \tilde{x}_{n+p})^T$ (where h is the number of dimension of the control amount) causes the predicted control amount $\tilde{X}_{n+p}=(\tilde{X}1_{n+p}, \tilde{X}2_{n+p}, \ldots, \tilde{X}h_{n+p})^T$ to be transmitted after the response time $p\Delta t$ has elapsed. The output signal is obtained from the input signal by a forward calculation of the neutron circuit model 11.

In the case where the control amount predicting section 7 comprises the neutron circuit model 11, the control amount correcting section 8 obtains a correction amount of the virtual operating amount $\hat{U}_n$ by performing an error back propagation calculation of the neutron circuit model 11 so as to correct the virtual operating amount. The error back propagation calculation of the neutron circuit model 11 will be described later together with the forward calculation.

In the case where the control amount predicting section 7 comprises the neutron circuit model 11, the control amount correcting section 8 obtains the virtual operating amount $\hat{U}_n$ by the foregoing error back propagation calculation of the neutron circuit model 11 so as to correct the virtual operating amount.

In the case where the control amount predicting section 7 comprises the neutron circuit model 11, the learning section 4 is structured as follows.

The learning section 4 generates learning data in accordance with the response time $p\Delta t$ of the control target 1, the operation delay time $q\Delta t$, the transmission dead time $r\Delta t$, the previous control amount and the operating amount stored in the observation data storing section 5 so as to learn the neutron circuit model 11 forming the control amount predicting section 7. If the operating section 3 involves operation delay time and the transmitting section 21 involves transmission dead time, performing of learning by using input signal $(U_s, X_s)$ and output signal $(X_{s+p})$ (s=n−1, n−1+1, ..., n−p−1) as the learning data causes the neutron circuit model 11 to transmit the control amount $X_{s+p}$ after time $p\Delta t$ has elapsed in accordance with the control amount $X_s$ measured at time $s\Delta t$ and the operating amount $U_s$ supplied to the control target 1 at time $s\Delta t$. If control is performed by using the neutron circuit model 11 as the control amount predicting section 7, the adjusting section 2 regards the control amount $X_{n-r}$ observed $r\Delta t$ before which is the transmission dead time as the present control amount $X_n$. Moreover, the value of the operating amount $U_n$ for causing the predicted control amount $\tilde{X}_{n+p}$ to approximate the required control amount $X^d$ is unintentionally obtained. Since the foregoing value is supplied to the control target 1 after the operation delay time $q\Delta t$ has elapsed, accurate control cannot be performed.

Accordingly, the present invention is structured in such a manner that input of the control amount $X'_n$ which is supplied to the adjusting section 2 at time $n\Delta t$ and the adjustment signal $C_n$ which is transmitted at time $n\Delta t$ causes learning of the neutron circuit model 11 to be performed in such a manner that the predicted control amount $\tilde{X}_{n+p}$ after the time $p\Delta t$ has elapsed is transmitted from the neutron circuit model 11 by using the control amount $X_{s-r}=(X1_{s-r}, X2_{s-r}, \ldots, Xh_{s-r})$ measured by the control target 1 before the transmission dead time $r\Delta t$ and operating amount $U_{s+q}+ (U1_{s+q}, U2_{s+q}, \ldots, Xh_{s+q})$ which is supplied to the control target 1 after the operation delay time $q\Delta t$ as input signals and the control amount $X_{s+p}$ ($X1_{s+p}, X2_{s+p}, \ldots, xh_{s+p}$) as the teacher signal (s=n−1+r, n−1+r+1, ..., n−p−1). If learning can be performed with the above-mentioned leaning data, the adjustment signal $C_n$ obtained by the adjusting section 2 when the control is performed is an operating amount which causes the control amount $X1_{n+p}$ after the time $p\Delta t$ has elapsed to approximate the required control amount $X^d$ when supplied to the control target 1 after the operation delay time $q\Delta t$ has elapsed. As a result, accurate control can be performed.

A seventh embodiment of the present invention will now be described with reference to FIG. 20.

A control apparatus shown in FIG. 20 has a control target such that the control apparatus shown in FIG. 16 is additionally provided with the operation delay time measuring section 20 and the transmission dead-time measuring section 22. The operation delay time measuring section 20 calculates the operation delay time $q\Delta t$ taken for the adjustment signal to be supplied to the operating section 3 so as to be transmitted as the operating amount in accordance with the time sequence $C=(C_{n-m}, C_{n-m+1}, \ldots, C_{n-1})$ of the adjustment signal calculated by the adjusting section 2 in the previous unit time m and the time sequence $U=(U_{n-m}, U_{n-m+1}, \ldots, U_{n-1})$ of the operating amount transmitted from the operating section 3 so as to transmit the operation delay time $q\Delta t$ to the learning section 4. The transmission dead-time measuring section 22 calculates the transmission dead time $r\Delta t$ taken for the control amount measured by the control target 1 to be supplied to the adjusting section 2 in accordance with the time sequence $X=(X_{n-m}, X_{n-m+1}, \ldots, X_{n-1})$ of the control amount measured by the control target 1 in the previous unit time m and time sequence $X'=(X'_{n-1}, X'_{n-m+1}, \ldots, X'_{n-1})$ supplied to the adjusting section 2 so as to transmit the transmission dead time $r\Delta t$ to the learning section 4. Note that m is a positive integer. As a result of addition of the operation delay time measuring section 20, even if the operation delay time is changed attributable to change in the characteristic of the operating section 3, the operation delay time measuring section 20 calculates the operation delay time $q\Delta t$ after the change has occurred so as to be transmitted to the learning section 4. The learning section 4 generates learning data in accordance with the operation delay time $q\Delta t$ supplied from the operation delay time measuring section 20 to perform learning. Therefore, even if the operation delay time is changed, control can accurately be continued. As a result of addition of the transmission dead-time measuring section 22, even if the transmission dead time is changed attributable to change in the characteristics of the transmitting section 21, the transmission dead-time measuring section 22 calculates the transmission dead time $r\Delta t$ after the change has occurred so as to transmit the transmission dead time $r\Delta t$ to the learning section 4. The learning section 4 generates in accordance with the transmission dead time $r\Delta t$ supplied from the transmission dead-time measuring section 22 to perform learning. Therefore, even if the transmission dead time is changed, control can accurately be continued.

An example will now be described in which the present invention is applied to an apparatus for controlling the dissolved oxygen density in a sewage-treatment process.

FIG. 21 is a block diagram showing the structure of a control apparatus according to the example of the present invention.

As shown in FIG. 21, in a sewage-treatment process 23, the dissolved oxygen density and the inflow of the sewage, which are the control amounts, are measured and the aeration air quantity, which is the operating amount, is supplied at every unit time $\Delta t$. Although dissolved oxygen density $DO_n$ and the inflow of the sewage $Qinf_n$, which have been measured at time $n\Delta t$, and the aeration air quantity $Qaer_{n-1}$ supplied to the sewage-treatment process 23 before the unit time are supplied to a adjusting section 25 through a transmitting section 24, they are supplied to the adjusting section 25 after delay of the transmission dead time because the transmitting section 24 has a transmission dead time. The aeration air quantity, the dissolved oxygen density and inflow of the sewage supplied to the adjusting section 25 at time $n\Delta t$ are expressed as $Qaer'_n$, $DO'_n$ and $Qinf_{n-1}$, respectively. The adjusting section 25 calculates the adjustment signal $C_n$ in accordance with the target dissolved oxygen density $DO^d$, the aeration air quantity $Qaer'_{n-1}$, the dissolved oxygen density $DO'_n$ and the inflow of the sewage $Qinf'_n$. A blower 26 converts the adjustment signal $C_n$ calculated by the adjusting section 25 into the aeration air quantity $Qaer_n$ so as to be transmitted to the sewage-treatment process 23. The sewage-treatment process 23 is supplied with the aeration air quantity $Qaer_n$ transmitted from the blower 26.

An operation delay time measuring section 27 calculates operation delay time $q\Delta t$ required for the adjustment signal to be realized as the aeration air quantity in accordance with the time sequence $C=(C_{n-m}, C_{n-m+1}, \ldots, C_{n-1})$ of the adjustment signals calculated by the adjusting section 25 in the previous unit time m and the time sequence Qaer= $(Qaer_{n-m}, Qaer_{n-m-1}, \ldots, Qaer_{n-1})$ of the aeration air quantity transmitted from the blower 26. Note that m is a positive integer.

A transmission dead-time measuring section 28 calculates transmission dead time $r\Delta t$ taken from observation of the dissolved oxygen density in the sewage-treatment process 23 to input to the adjusting section 25 in accordance with the time sequence $DO=(DO_1, DO_2, \ldots, DO_{n-1})$ of the dissolved oxygen density observed in the sewage-treatment process 23 in the previous unit time m and the time sequence $DO'= (DO'_1, DO'_2, \ldots, DO'_{n-1})$ of the dissolved oxygen density supplied to the adjusting section 25.

A learning section 29 adjusts parameter W for the adjusting section 25 in accordance with observation data consisting of the response time $p\Delta t$ taken from input of the aeration air quantity to the sewage-treatment process 23 to appearance of the influence of the aeration air quantity on the dissolved oxygen density, the operation delay time qΔt calculated by the operation delay time measuring section 27, the transmission dead time rΔt calculated by the transmission dead-time measuring section 28, the previous aeration air quantity (Qaer$_{n-l}$, Qaer$_{n-l+1}$, ..., Qaer$_{n-1}$) stored in the observation data storing section 30, the dissolved oxygen density (DO$_{n-1}$, DO$_{n-l+1}$, ..., DO$_{n-1}$) and the inflow (Qinf$_{n-1}$, Qinf$_{n-l+1}$, ..., Qinf$_{n-1}$), the parameter W being transmitted to the adjusting section 25.

A case will now be described with reference to FIG. 22 where the adjusting section 25 comprises a virtual aeration amount calculating section, a dissolved oxygen density predicting section and an aeration air quantity correcting section. The virtual aeration amount calculating section 31 calculates virtual aeration amount Qaeî$_n$ in accordance with the dissolved oxygen density DO'$_n$ measured by the sewage-treatment process 23 and the target dissolved oxygen density DO$^d$. The calculation may be performed as follows by using K as a positive constant for example:

$$Qâer_n = Qaer'_{n-1} + k(DO^d - DO_n),$$

As an alternative to this, the following method may be employed:

$$Qâer_n = Qaer'_{n-1},$$

in which the aeration air quantity before the unit time is employed as the virtual aeration quantity as it is.

A dissolved oxygen density predicting section 32 calculates the predicted dissolved oxygen density $\overline{DO}_{n+p}$ after time pΔt has elapsed in the case where the virtual aeration quantity Qaeî$_n$ has been transmitted as the adjustment signal C$_n$ in accordance with the virtual aeration quantity Qaeî$_n$, aeration air quantity Qaer'$_{n-1}$ before the unit time, the dissolved oxygen density DO'$_n$ measured by the sewage-treatment process 23 and the sewage inflow Qinf'$_n$. Note that p is the response time of the sewage-treatment process 23.

An aeration air quantity correcting section 33 corrects the virtual aeration quantity Qaeî$_n$ to cause the predicted dissolved oxygen density $\overline{DO}_{n+p}$ to approximate the target dissolved oxygen density DO$^d$ in accordance with the dissolved oxygen density $\overline{DO}_{n+p}$ predicted by the dissolved oxygen density predicting section 32 and the target dissolved oxygen density DO$^d$.

A first switch 34 is closed downwards when the dissolved oxygen density has been measured by the sewage-treatment process 23 so that the virtual aeration quantity Qaeî$_n$ calculated by the virtual aeration amount calculating section 31 is supplied to the dissolved oxygen density predicting section 32. Then, the first switch 34 is closed upwards until a next measurement is performed. As a result, prediction of the dissolved oxygen density, which is performed by the dissolved oxygen density predicting section 32, and correction of the aeration air quantity, which is performed by the aeration air quantity correcting section 33, are repeated by a predetermined number of time or until the difference between the predicted dissolved oxygen density $\overline{DO}_{n+p}$ and the target dissolved oxygen density DO$^d$ is made to be smaller than a predetermined value. After the prediction of the dissolved oxygen density, which is performed by the dissolved oxygen density predicting section 32, and the correction of the aeration air quantity, which is performed by the aeration air quantity correcting section 33, have been repeated by the predetermined number of times or the difference between the predicted dissolved oxygen density D$\overline{O}_{n+p}$ and the target dissolved oxygen density DO$^d$ has been made to be smaller than a predetermined value, the second switch 35 is closed so that the virtual aeration quantity Qaeî$_n$ is transmitted to the blower 26 as the adjustment signal C$_n$.

Figure 23:
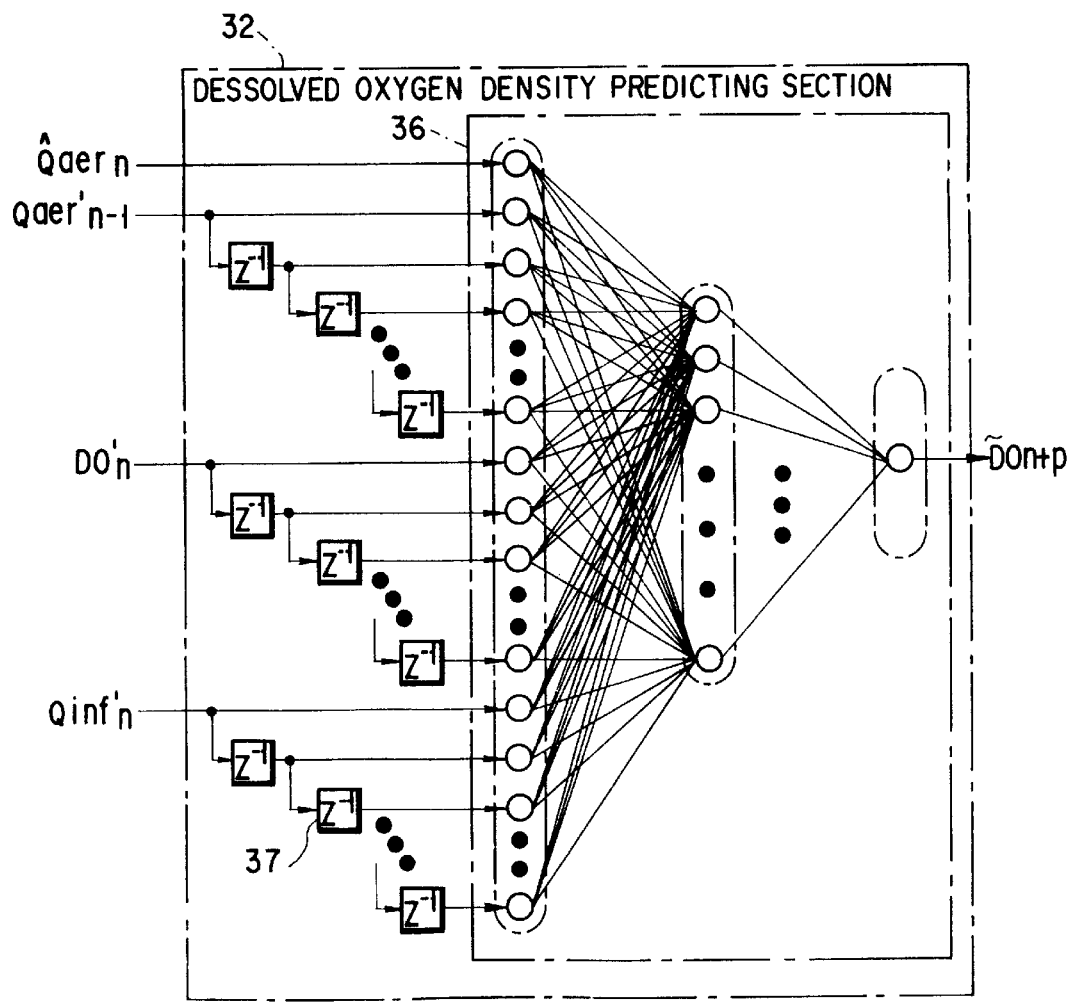
FIG. 23 is a diagram showing an example of the structure which is employed in a case where the control amount predicting section shown in FIG. 22 comprises a neural circuit model.

A structure in which the dissolved oxygen density predicting section 32 is a multi-layered neural circuit model will now be described. FIG. 23 is a view of explanatory showing the dissolved oxygen density predicting section 32. The dissolved oxygen density predicting section 32 is supplied with the virtual aeration quantity Qaeî$_n$, the dissolved oxygen density DO'$_n$, the sewage inflow Qinf'$_n$ and the aeration air quantity Qaer'$_{n-1}$ before the unit time. A time delay takes place attributable to a delay time element 37 having a multi-layered structure so that aeration air quantity (Qaer'$_{n-maer+1}$, Qaer'$_{n-maer+2}$, ..., Qaer'$_{n-1}$) from time (n−m$_{aer}$+1) Δt to time (n−1) Δt, dissolved oxygen density (DO'$_{n-mdo+1}$, DO'$_{n-mdo+2}$, ..., DO'$_n$) from time (n−m$_{do}$+1) Δt to time nΔt, the sewage inflow (Qinf'$_{n-minf+1}$, Qinf'$_{n-minf+2}$, ..., Qinf'$_n$) from time (n−m$_{inf}$+1) Δt to time nΔt and virtual aeration quantity Qaeî$_n$ are supplied to the neural circuit model 36. Note that m$_{aer}$, m$_{do}$ and m$_{inf}$ are positive integers. The neural circuit model 36 performs the forward calculation in accordance with the foregoing input signals to calculate the predicted dissolved oxygen density $\overline{DO}_{n+p}$ at time (n+p) Δt.

Figure 24:
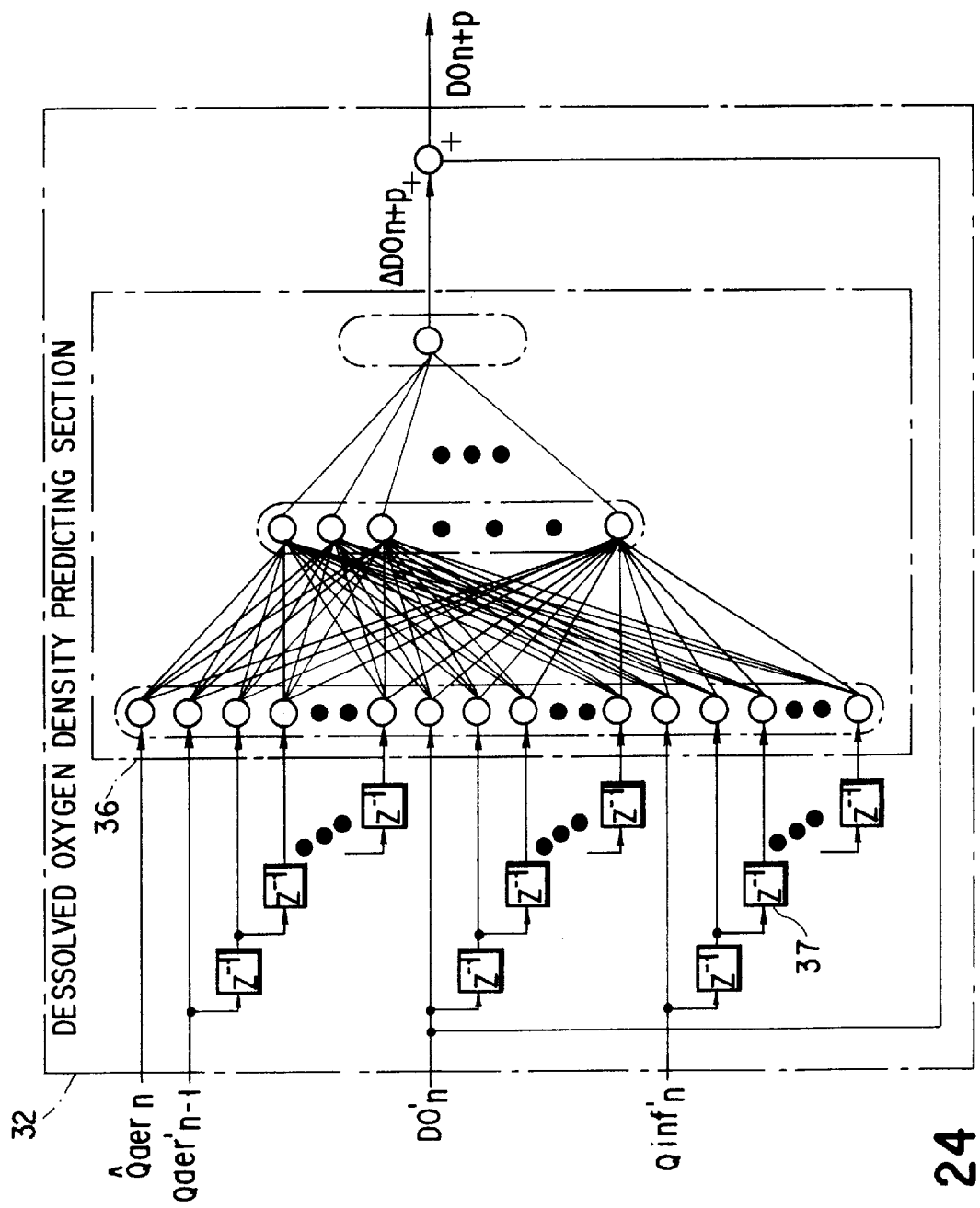
FIG. 24 is a diagram showing an example of the structure which is employed in the case where the control amount predicting section shown in FIG. 22 comprises a neural circuit model.

The dissolved oxygen density predicting section 32 may be structured into another form. For example, a structure as shown in FIG. 24 may be employed in which the amount of change $\Delta \overline{DO}_{n+p}$ from the dissolved oxygen density DO'$_n$ at time nΔt of the predicted dissolved oxygen density $\overline{DO}_{n+p}$ at time (n+p) Δt is calculated by the neural circuit model; and the calculated amount of change and the dissolved oxygen density DO'$_n$ at time nΔt are added to each other so as to transmit the result of addition as the predicted dissolved oxygen density $\overline{DO}_{n+p}$ at time (n+p) Δt.

The aeration air quantity correcting section 33 corrects the virtual aeration quantity Qaeî$_n$ to cause the predicted dissolved oxygen density $\overline{DO}_{n+p}$ to approximate the target dissolved oxygen density DO$^d$ in accordance with the predicted dissolved oxygen density $\overline{DO}_{n+p}$ calculated by the dissolved oxygen density predicting section 32 and the target dissolved oxygen density DO$^d$. In the case where the dissolved oxygen density predicting section 32 comprises the neural circuit model 36, the aeration air quantity correcting section 33 has the same structure as that of the neural circuit model 36 of the dissolved oxygen density predicting section 32 to perform the error back propagation calculation of the neural circuit model 36 so as to obtain the amount of correction of the virtual aeration quantity Qaeî$_n$ so that calculation is performed.

The learning section 29 will now be described. In the case where the dissolved oxygen density predicting section 32 comprises the neural circuit model 36, the learning section 29 generates learning data in accordance with observation data composed of the response time pΔt of the sewage-treatment process 23, the operation delay time qΔt measured by the operation delay time measuring section 27 and the transmission dead time rΔt measured by the transmission dead-time measuring section 28 and the previous dissolved oxygen density, the sewage inflow and the aeration air quantity stored in the observation data storing section 30 so that learning of the neural circuit model 36 forming the dissolved oxygen density predicting section 32 is performed.

Observation data stored in the observation data storing section 30 is composed of the aeration air quantities which have been supplied to the sewage-treatment process 23, the dissolved oxygen density measured by the sewage-treatment process 23 and the sewage inflow. If learning of the neural circuit model 36 is performed by using the observation data, input signal ($Qaer_s$, $Qaer_{s-1}$, ..., $Qaer_{s-maer+1}$, $DO_s$, $DO_{s-1}$, ..., $DO_{s-mdo+1}$, $Qinf_s$, $Qinf_{s-1}$, ..., $Qinf_{s-minf+1}$) and output signal $DO_{s+p}$ ($s=n-1+m_{max}$, $n-1+m_{max}+1$, ..., $n-p-1$) (where $m_{max}$ is the maximum value of each of $m_{aer}$, $m_{do}$ and $m_{inf}$), the dissolved oxygen density predicting section 32 unintentionally predicts the dissolved oxygen density after the response time $p\Delta t$ has elapsed in such a manner that the dissolved oxygen density, the sewage inflow and the aeration air quantity observed time $r\Delta t$ before are regarded as current values. Although the aeration air quantity $Qaer_n$ obtained so as to cause the predicted dissolved oxygen density $DO_{n+p}$ to approximate the target dissolved oxygen density $DO^d$ is the aeration air quantity, which is supplied to the sewage-treatment process 23 at time $n\Delta t$, it is supplied to the sewage-treatment process 23 after time $q\Delta t$ has elapsed. As a result, accurate control cannot be performed.

In this example, when the dissolved oxygen density $DO'_n$, the sewage inflow $Q1nf'_n$ and the aeration air quantity $Qaer'_{n-1}$, which are supplied to the adjusting section 25 at time $n\Delta t$, the adjustment signal $C_n$, which is transmitted from the adjusting section 25, are supplied to the dissolved oxygen density predicting section 32, learning of the neural circuit model 36 is performed in such a manner that the predicted dissolved oxygen density $DO_{n+p}$ after the response time $p\Delta t$ of the sewage-treatment process 23 is transmitted. Therefore, the operation delay time $q\Delta t$ is calculated by the operation delay time measuring section 27, the transmission dead-time measuring section 28 calculates the transmission dead time $r\Delta t$ and learning data is generated ($s=n-l+r+m_{aer}$, ..., $n-p-1$) in such a manner that the aeration air quantity $Qaer_{s+q}$, which is supplied to the sewage-treatment process 23 after the operation delay time $q\Delta t$, the aeration air quantity ($Qaer_{s-r-1}$, $Qaer_{s-r-2}$, ..., $Qaer_{s-r-maer+1}$) supplied to the sewage-treatment process 23 from time before $(r+1)\Delta t$ to time before $(r+m_{aer}-1)\Delta t$, the dissolved oxygen density $DO_{s-r}$, $DO_{s-r-1}$, ..., $DO_{s-r-mdo+1}$) measured by the sewage-treatment process 23 from time before $r\Delta t$ to time before $(r+m_{do}-1)\Delta t$ and the sewage inflow ($Qinf_{s-r}$, $Qinf_{s-r-1}$, ..., $Qinf_{s-r-minf+1}$) are used as input signals and the dissolved oxygen density $DO_{s+p}$ after the response time $p\Delta t$ has elapsed is used as the output is. If learning is performed by using the foregoing learning data, the adjustment signal $C_n$ obtained by the adjusting section 25 when the control has been performed is the aeration air quantity which causes the dissolved oxygen density to approximate the target dissolved oxygen density when the adjustment signal $C_n$ is supplied to the sewage-treatment process 23 after the operation delay time attributable to the blower 26. Therefore, accurate control can be performed.

The overall calculating procedure of the control apparatus will now be described with reference to a flow chart shown in FIG. 25. According to the flow chart shown in FIG. 25, control is performed from time 0 to time $N\Delta t$. Since the same procedure is repeated for each unit time $\Delta t$ during the foregoing period, a procedure for obtaining the aeration air quantity at time $n\Delta t$ will now be described.

(a) The target dissolved oxygen density $DO^d$ set previously, the observed dissolved oxygen density $DO'_n$ and the aeration air quantity $Qaer'_{n-1}$ before unit time are supplied to the virtual aeration amount calculating section 31 so that the virtual aeration quantity $Qae\hat{r}_n$ is transmitted.

(b) The first switch 34 is closed downwards so that the virtual aeration quantity $Qae\hat{r}_n$ obtained in step (a), the aeration air quantity $Qaer'_{n-1}$ before unit time, the dissolved oxygen density $DO'_n$ and the sewage inflow $Qinf'_n$ are supplied to the dissolved oxygen density predicting section 32. As a result of the forward calculation of the neural circuit model 36, the predicted dissolved oxygen density $\overline{DO}_{n+p}$ after the response time $p\Delta t$ has elapsed is transmitted.

(c) The predicted dissolved oxygen density $\overline{DO}_{n+p}$ obtained in step (b) and the target dissolved oxygen density $DO^d$ are supplied to the aeration air quantity correcting section 33. Then, the error back propagation calculation of the neural circuit model 36 is performed so that the amount of calculation of the virtual aeration quantity is obtained and the corrected virtual aeration quantity $Qae\hat{r}_n$ is transmitted.

(d) The first switch 34 is closed upwards until a predetermined number of time is repeated or until the difference between the target dissolved oxygen density $DO^d$ and the predicted dissolved oxygen density $\overline{DO}_{n+p}$ is included in a predetermined range so that the corrected virtual aeration quantity $Qaer_n$ is supplied to the dissolved oxygen density predicting section 32 and the steps (b) and (c) are repeated.

(e) If the condition shown in (d) is satisfied, the second switch 35 is closed so that the virtual aeration quantity $Qae\hat{r}_n$ is, as the adjustment signal $C_n$, supplied to the blower 26. The blower 26 supplies the aeration air quantity $Qaer_n$ to the sewage-treatment process 23.

The foregoing steps (a) to (e) are repeated at every unit time $\Delta t$.

The forward calculation, the error back propagation calculation and the learning calculation of the neural circuit model 36 will now be described. In the case where the dissolved oxygen density predicting section 32 is composed of a multi-layered neural circuit model, the predicted value of the dissolved oxygen density is obtained by the forward calculation of the multi-layered neural circuit model, while the correction amount of the aeration air quantity is obtained by the error back propagation calculation of the multi-layered neural circuit model.

Initially, the forward calculation will now be described with reference to FIG. 23.

The units of the input layers are supplied with the virtual aeration quantity $Qae\hat{r}_n$, the aeration air quantity ($Qaer'_{n-1}$, $Qaer_{n-2}$, ..., $Qaer_{n-maer+1}$) from time $(n-1)\Delta t$ to time $(n-m_{aer}+1)\Delta t$, the dissolved oxygen density ($DO'_n$, $DO'_{n-1}$, ..., $DO'_{n-mdo+1}$) from time $n\Delta t$ to time $(n-m_{do}+1)\Delta t$ and the sewage inflow ($Qinf_n$, $Qinf_{n-1}$, ..., $Qinf_{n-minf+1}$) from time $n\Delta t$ to time $(n-m_{inf}+1)\Delta t$ in such a manner that one signal is supplied the one unit. Thus, the predicted value $DO_{n+p}$ of the dissolved oxygen density at time $(n+p)\Delta t$ is transmitted. Note that $m_{do}$, $m_{inf}$ and $m_{aer}$ are each a positive integer. A forward calculation for calculating from the foregoing input signals to obtain an output signal is expressed as follows:

Assuming that $xi_i$ is the input value for the i-th unit of the input layer, $$xi_1 = Qaer_n$$

$$xi_2 = Qaer'_{n-1}$$

$$xi_3 = Qaer'_{n-2}$$

$$\vdots$$

$$xi_{m_{aer}} = Qaer'_{n-m_{aer}+1}$$

$$xi_{m_{ear}} + 1 = DO'_n$$

-continued $$xi_{m_{ear}+2} = DO'_{n-1}$$

$$\vdots$$

$$xi_{M_{ear}+m_{do}} = DO'_{n-m_{do}+1}$$

$$xi_{m_{aer}+m_{do}+1} = Q\ inf_n$$

$$xi_{m_{aer}+m_{do}+2} = Q\ inf_{n-1}$$

$$xi_{m_{ear}+m_{do}+m_{inf}} = Q\ inf_{n-m_{inf}+1}$$

The input/output function of the input layer unit is identity function. Output $yi_i$ (i=1, ..., Ni) of the input layer unit is expressed as follows:

$yi_i = xi_i$ (i=1, ..., Ni)

where Ni is the number of the units in the input layers (Ni=$m_{do}+m_{aer}+m_{inf}$). The input value $xh_j$ of the i-th unit in the intermediate layer is a value obtained by subtracting the threshold $thh_j$ of the intermediate layer unit from the sum obtained by weighting the output value of the input layer unit with the bond load value between the input layer and the intermediate layer.

$$xh_j = \sum_{i=1}^{Ni} (w1_{j,i} * yi_i) - thh_j (j = 1, \ldots, Nh)$$

where $w1_{j,i}$ is the bond load value between the first unit of the input layer and the j-th unit of the intermediate layer, thh is the threshold of the j-th unit in the intermediate layer and Nh is the number of units in the intermediate layer.

Assuming that the input/output function of the intermediate layer unit is the following sigmoid function:

$$f(x) = \frac{2}{1 + \exp(-x)} - 1$$

Output value yhj of the intermediate layer unit can be expressed as follows by using input value $xh_j$:

$yh_j = f(xh_j)$ (j=1, ..., Nh)

where $yh_j$ is an output value from the j-th unit in the intermediate layer. Input value $xo_k$ (k=1) of the k-th unit of the output layer is a value obtained by subtracting the threshold of the output layer unit from the sum obtained by weighting the output value from the intermediate layer unit with the bond load value between the intermediate layer and the output layer.

$$xo_k = \sum_{j=1}^{Nh} (w2_{k,j} * xh_j) - tho_k$$

where $W2_{k,j}$ is the bond load value between the j-th unit in the intermediate layer and the k-th unit in the output layer and $tho_k$ is the threshold of the k-th unit in the output layer. The input/output function of the output layer unit is a identity function.

$yo_k = xo_k$ (k=1)

The output value from the output layer unit is the predicted dissolved oxygen density $\overline{DO}_{n+p}$.

$\tilde{D}O_{n+p} = yo_1$

The foregoing equations are used to perform the forward calculation of the triple-layered neural circuit model.

The error back propagation calculation will now be described. When the dissolved oxygen density $\overline{DO}_{n+p}$ predicted by the dissolved oxygen density predicting section 32 and the target dissolved oxygen density $DO^d$ have been supplied to the aeration air quantity correcting section 33, the aeration air quantity correcting section 33 calculates and corrects the correction amount of the virtual aeration quantity. The correction amount of the virtual aeration quantity can be calculated by the error back propagation calculation of the neural circuit model 36. The calculation equation for use in the aeration air quantity correcting section 33 will now be described.

Error function E is defined as follows in accordance with the dissolved oxygen density $\overline{DO}_{n+p}$ predicted by the dissolved oxygen density predicting section 32 and the target dissolved oxygen density $DO^d$:

$$E = \frac{1}{2} (\tilde{D}O_{n+p} - DO^d)^2$$

Then, the correction amount of the output value from the unit for reducing the error function is sequentially obtained from the output layers to the input layers so that the correction amount of the input signal is finally obtained. The correction amount of the output value from the output layer is calculated as follows by using positive constant h:

$$\Delta yo_1 = -\eta \frac{\partial E}{\partial yo_1}$$

$$= -\eta(\tilde{D}O_{n+p} - DO^d)$$

The correction amount of the output value from the intermediate layer unit is expressed as follows by using the correction amount of the output layer unit:

$$\Delta yh_i = \frac{dyo_1}{dxo_1} \frac{\partial xo_1}{\partial yh_j} \Delta yo_1$$

$$= w2_{1,j} \Delta yo_1$$

Similarly, the correction amount of the input layer unit can be expressed as follows by using the correction amount of the intermediate layer unit:

$$\Delta yi_i = \sum_{j=1}^{Nh} \frac{dyh_j}{dxh_j} \frac{\partial xh_j}{\partial yi_i} \Delta yh_j$$

$$= \sum_{j=1}^{Nh} f'(xh_j) w1_{j,i} \Delta yh_j$$

Note that f' (x) is a derived function of the sigmoid function f (x) which is specifically expressed as follows:

$$f'(x) = \frac{1}{2} (1 + f(x))(1 - f(x))$$

Since the input/output function of the input layer unit is a identity function, the correction amount of the output value is the correction amount of the input value as it is. Thus, the correction amount $\Delta Qaer_n$ of the virtual aeration quantity $Qae\hat{r}_n$ is expressed as follows:

$\Delta \hat{Q}aer_n = \Delta yi_1$

The thus-obtained correction amount is added to the virtual aeration quantity $Qae\hat{r}_n$. Thus, the error back propagation calculation and the correction of the virtual aeration quantity, which is realized attributable to the error back propagation calculation, are performed.

The operation of learning of the multi-layered neural circuit model will now be described with reference to FIG. 26. The learning operation is performed to cause the dissolved oxygen density predicting section 32 is able to correspond to the moderate change in the characteristics of the sewage-treatment process.

Referring to FIG. 26, reference numeral 30 represents a observation data storing section, 38 represents a subtractor, 39 represents an error back propagation learning section, 40 represents an arrow indicating input of the output value from the input layer unit in the neural circuit model 36 to the error back propagation learning section 39, reference numeral 41 represents an arrow input of the output value from the intermediate layer unit of the neural circuit model 36 to the error back propagation learning section 39, reference numeral 42 represents an arrow indicating input of the bond load value between the intermediate layer and the output layer of the neural circuit model 36 to the error back propagation learning section 39, reference numeral 43 represents an arrow indicating transmission of bonded load value between the input layer and the intermediate layer calculated by the error back propagation learning section 39 and the correction amount of the threshold of the intermediate layer unit to each bond load and intermediate layer unit to correct each bond load value and the threshold, reference numeral 44 represents an arrow indicating transmission of the bond load value between the intermediate layer and the output layer calculated by the error back propagation learning section 39 and the correction amount of the threshold of the output layer unit to each bond load and the output layer unit to correct each bond load value and the threshold.

In a period of previous time $s\Delta t$ ($s=n-1+m_{aex}, \ldots, n-p-1$), the aeration air quantity $Qaer_s$ at time $(s+q)\Delta t$, the aeration air quantity ($Qaer_{s-r-maer+1}$, $Qaer_{s-r-maer+2}$, $\ldots$, $Qaer_{s-r-1}$) from time $(s-r-m_{aer}+1)\Delta t$ to time $(s-r-1)\Delta t$, the dissolved oxygen density ($DO_{s-r-mod+1}$, $DO_{s-r-mdo+2}$, $\ldots$, $DO_{s-r}$) from time $(s-r-m_{do}+1)\Delta t$ to time $(S-r)\Delta t$, and the inflow of the sewage ($Qinf_{s-r-minf+1}$, $Qinf_{s-r-minf+2}$, $\ldots$, $Qinf_{s-r}$) from time $(s-r-m_{inf}+1)\Delta t$ to time $(s-r)\Delta t$ are, as input signals, supplied from the observation data storing section 30 to the neural circuit model 36. The neural circuit model 36 calculates the forward calculation of the foregoing input signals so as to transmit the output signal $\overline{DO}_{s+q}$. The subtractor 38 calculates the difference $DO_{s+p} - \overline{DO}_{s+p}$ between the dissolved oxygen density $DO_{s+p}$ after the response time has elapsed and transmitted from the observation data storing section 30 as the teacher signal and the output signal $\overline{DO}_{s+p}$ from the neural circuit model 36. The result of the calculation is supplied to the error back propagation learning section 39. The error back propagation learning section 39 is, in addition to the foregoing difference, supplied with each output from the input layer unit of the neural circuit model 36, each output value from the intermediate layer unit and each bond load value between the intermediate layer and the output layer so as to calculate the correction value of the bond load value and the threshold.

In the subtractor 38, error function E is defined as follows in accordance with the difference between the teacher signal $DO_{s+p}$ and the output signal $\overline{DO}_{s+p}$:

$$E = \frac{1}{2} \sum_{s=S1}^{S2} (\tilde{DO}_{s+p} - DO_{s+p})^2$$

$$S1 = n - l + m_{max}$$

$$S2 = n - p - 1$$

In accordance with the error back propagation calculation, the correction amount of each of the bond load value and the threshold is calculated as follows:

$$\Delta w2_{k,j} = -\in \frac{\partial E}{\partial w2_{k,j}}$$

$$= -\in \sum_{s=S1}^{S2} \frac{\partial E}{\partial yo_k^s} \frac{dyo_k^s}{dxo_k^s} \frac{\partial xo_k^s}{\partial w2_{k,j}}$$

$$= -\in \sum_{s=S1}^{S2} (\tilde{DO}_{s+1} - DO_{s+1}) yh_j^s$$

$$(j = 1, 2, \ldots, Nh; k = 1)$$

$$\Delta tho_k = -\in \frac{\partial E}{\partial tho_k}$$

$$= -\in \sum_{s=S1}^{S2} \frac{\partial E}{\partial yo_k^s} \frac{dyo_k^s}{dxo_k^s} \frac{\partial xo_k^s}{\partial tho_k}$$

$$= -\in \sum_{s=S1}^{S2} -(\tilde{DO}_{s+1} - DO_{s+1}) \quad (k = 1)$$

$$\Delta w1_{j,i} = -\in \frac{\partial E}{\partial w1_{j,i}}$$

$$= -\in \sum_{s=S1}^{S2} \sum_{k=1}^{1} \frac{\partial E}{\partial yo_k^s} \frac{dyo_k^s}{dxo_k^s} \frac{\partial xo_k^s}{\partial yh_j^s}$$

$$\frac{dyh_j^s}{dxh_j^s} \frac{\partial xh_j^s}{\partial w1_{j,i}}$$

$$= -\in \sum_{s=S1}^{S2} \sum_{k=1}^{1} (\tilde{DO}_{s+1} - DO_{s+1}) w2_{k,j} f'(xh_j^s) yi_i^s$$

$$(i = 1, 2, \ldots, Ni; j = 1, 2, \ldots, Nh)$$

$$\Delta thh_j = -\in \frac{\partial E}{\partial thh_j}$$

$$= -\in \sum_{s=S1}^{S2} \sum_{k=1}^{1} \frac{\partial E}{\partial yo_k^s} \frac{dyo_k^s}{dxo_k^s} \frac{\partial xo_k^s}{\partial yh_j^s}$$

$$\frac{dyh_j^s}{dxh_j^s} \frac{\partial xh_j^s}{\partial thh_j}$$

$$= -\in \sum_{s=S1}^{S2} \sum_{k=1}^{1} -(\tilde{DO}_{s+1} - DO_{s+1}) w2_{k,j} f'(xh_j^s)$$

$$(j = 1, 2, \ldots, Nh)$$

where $\Delta w2_{k,j}$ is the correction amount of the bond load value $w2_{k,j}$ between the j-th unit in the intermediate layer and the k-th unit of the output layer, $\Delta tho_k$ is the correction amount of the threshold $tho_k$ of the k-th unit of the output layer, $\Delta w1_{j,i}$ is the correction amount of the bond load value $W1_{j,i}$ between the first unit in the input layer and the j-th unit in the intermediate layer, $\Delta thh_j$ is the correction amount of the threshold $thh_j$ of the j-th unit in the intermediate layer, e is a learning constant, $yo^s_k$ is an input value of the k-th unit in the output layer when data at time $s\Delta t$ has been supplied, $xo^s_k$ is an input value of the k-th unit in the output layer when data at time $s\Delta t$ has been supplied, $yh^s_j$ is an output value from the j-th unit in the intermediate layer when data at time $s\Delta t$ has been supplied, $xh^s_k$ is an input value of the j-th unit in the intermediate layer when data at time $s\Delta t$ has been supplied and $yi^s_i$ is an output value from the first unit in the control when data at time $s\Delta t$ has been supplied. In accordance with the foregoing correction amounts, the bond load value and the threshold are corrected.

It should be understood that the present invention is not limited to the foregoing embodiments, and a variety of modifications are permitted within the scope of the present invention.

For example, although the foregoing embodiment has been described about the triple-layered neural circuit model as the prediction model, the present invention may be adapted to a multi-layered neural circuit model. Moreover, the present invention may be adapted to a function approximation model having a learning function. Although the input/output signals to and from the dissolved oxygen density predicting section are used such that the dissolved oxygen density is predicted after time p$\Delta$t has elapsed in accordance with the dissolved oxygen density, the sewage inflow and the aeration air quantity measured previously and at present, the number of the input signals may be decreased or another observation data item may be supplied if the prediction is permitted. As for the output signal, a method may be employed in which the dissolved oxygen density after plural time moments is predicted to obtain the correction amount of the virtual aeration quantity in accordance with errors among the predicted dissolved oxygen densities and the target dissolved oxygen density, as well as prediction of the dissolved oxygen density after time p$\Delta$t has elapsed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously; and learning means for learning internal parameters for said adjusting means in accordance with response time taken for the control target from input of the operating amount from said operating means to said control target to appearance of an influence of the operating amount on the control amount and observation data stored in said observation data storing means.

2. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously;

response time calculating means for calculating response time taken for said control target from input of the operating amount from said operating means to said control target to appearance of an influence of the operating amount on the control amount in accordance with the operating amount transmitted from said operating means and the control amount measured by said control target; and learning means for learning internal parameters for said adjusting means in accordance with the response time calculated by said response time calculating means and observation data stored in said observation data storing means.

3. A control apparatus according to claim 2, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount.

4. A control apparatus according to claim 3, wherein said control amount predicting means includes a neural circuit model;

calculations in said operating amount correcting means are performed by error back propagation calculations of said neural circuit model; and said learning means generates learning data in accordance with the response time and observation data stored in said observation data storing means so as to perform learning of the neural circuit model forming said control amount predicting means.

5. A control apparatus according to claim 4, wherein said learning means performs learning such that observation data having the control amount and the operating amount at the same time is used as an input signal and the control amount after the response time has elapsed is used as a teacher signal when learning data is generated in accordance with the observation data stored in said observation data storing means.

6. A control apparatus according to claim 1, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount.

7. A control apparatus according to claim 6, wherein said control amount predicting means includes a neural circuit model;

calculations in said operating amount correcting means are performed by error back propagation calculations of said neural circuit model; and said learning means generates learning data in accordance with the response time and observation data stored in said observation data storing means so as to perform learning of the neural circuit model forming said control amount predicting means.

8. A control apparatus according to claim 7, wherein said learning means performs learning such that observation data having the control amount and the operating amount at the same time is used as an input signal and the control amount after the response time has elapsed is used as a teacher signal when learning data is generated in accordance with the observation data stored in said observation data storing means.

9. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously; and learning means for learning internal parameters for said adjusting means in accordance with response time taken for said control target from input of the operating amount from said operating means to said control target to appearance of an influence of the operating amount on the control amount, operation delay time taken for the adjustment signal calculated by said adjusting means to appear as an operating amount through said operating means and observation data stored in said observation data storing means.

10. A control apparatus according to claim 9, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount.

11. A control apparatus according to claim 10, wherein said control amount predicting means includes a neural circuit model;

calculations in said operating amount correcting means are performed by error back propagation calculations of said neural circuit model; and said learning means generates learning data in accordance with the response time, the operation delay time and observation data stored in said observation data storing means so as to perform learning of the neural circuit model forming said control amount predicting means.

12. A control apparatus according to claim 11, wherein said learning means performs learning such that observation data having the control amount at the present time and an operating amount after the operation delay time from the present time is used as an input signal and the control amount after the response time has elapsed is used as a teacher signal when learning data is generated in accordance with the observation data stored in said observation data storing means.

13. A control apparatus according to claim 9, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount.

14. A control apparatus according to claim 13, wherein said control amount predicting means includes a neural circuit model;

calculations in said operating amount correcting means are performed by error back propagation calculations of said neural circuit model; and said learning means generates learning data in accordance with the response time, the operation delay time and observation data stored in said observation data storing means so as to perform learning of the neural circuit model forming said control amount predicting means.

15. A control apparatus according to claim 14, wherein said learning means performs learning such that observation data having the control amount at the present time and an operating amount after the operation delay time from the present time is used as an input signal and the control amount after the response time has elapsed is used as a teacher signal when learning data is generated in accordance with the observation data stored in said observation data storing means.

16. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously;

operation delay time measuring means for measuring operation delay time taken for the adjustment signal calculated by said adjusting means to appear as an operating amount through said operating means in accordance with the adjustment signal calculated by said adjusting means and the operating amount transmitted from said operating means; and learning means for learning internal parameters for said adjusting means in accordance with the operation delay time calculated by said operation delay time measuring means, the response time of said control target taken from input of the operating amount from said operating means to said control target to appearance of the operating amount on the control amount and observation data stored in said observation data storing means.

17. A control apparatus according to claim 16, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount.

18. A control apparatus according to claim 17, wherein said control amount predicting means includes a neural circuit model;

calculations in said operating amount correcting means are performed by error back propagation calculations of said neural circuit model; and said learning means generates learning data in accordance with the response time, the operation delay time and observation data stored in said observation data storing means so as to perform learning of the neural circuit model forming said control amount predicting means.

19. A control apparatus according to claim 18, wherein said learning means performs learning such that observation data having the control amount at the present time and an operating amount after the operation delay time from the present time is used as an input signal and the control amount after the response time has elapsed is used as a teacher signal when learning data is generated in accordance with the observation data stored in said observation data storing means.

20. A control apparatus according to claim 16, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount.

21. A control apparatus according to claim 20, wherein said control amount predicting means includes a neural circuit model;

calculations in said operating amount correcting means are performed by error back propagation calculations of said neural circuit model; and said learning means generates learning data in accordance with the response time, the operation delay time and observation data stored in said observation data storing means so as to perform learning of the neural circuit model forming said control amount predicting means.

22. A control apparatus according to claim 21, wherein said learning means performs learning such that observation data having the control amount at the present time and an operating amount after the operation delay time from the present time is used as an input signal and the control amount after the response time has elapsed is used as a teacher signal when learning data is generated in accordance with the observation data stored in said observation data storing means.

23. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously; and learning means for learning internal parameters for said adjusting means in accordance with response time taken for said control target from input of the operating amount from said operating means to said control target to appearance of an influence of the operating amount on the control amount, transmission dead time taken for the control amount measured by said control target to be supplied to said adjusting means through a transmitting means and observation data stored in said observation data storing means.

24. A control apparatus according to claim 23, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount performed by said operating amount correcting means.

25. A control apparatus according to claim 24, wherein said control amount predicting means includes a neural circuit model;

calculations in said operating amount correcting means is performed by error back propagation calculations of said neural circuit model; and said learning means generates learning data in accordance with the response time, the transmission dead time and observation data stored in said observation data storing means so as to perform learning of the neural circuit model forming said control amount predicting means.

26. A control apparatus according to claim 25, wherein said learning means performs learning such that observation data having the control amount before the transmission dead time and the operating amount at the present time is used as an input signal and the control amount after the response time has elapsed is used as a teacher signal when learning data is generated in accordance with the observation data stored in said observation data storing means.

27. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously;

transmission dead time measuring means for measuring transmission dead time taken for a transmitting means in accordance with the control amount measured by said control target and the control amount supplied to said adjusting means through said transmitting means; and learning means for learning internal parameters for said adjusting means in accordance with the transmission dead time measured by said transmission dead time measuring means, response time of said control target taken from input of the operating amount from said operating means to said control target to appearance of an influence of the operating amount on the control amount and observation data stored in said observation data storing means.

28. A control apparatus according to claim 27, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount performed by said operating amount correcting means.

29. A control apparatus according to claim 28, wherein said control amount predicting means includes a neural circuit model;

calculations in said operating amount correcting means is performed by error back propagation calculations of said neural circuit model; and said learning means generates learning data in accordance with the response time, the transmission dead time and observation data stored in said observation data storing means so as to perform learning of the neural circuit model forming said control amount predicting means.

30. A control apparatus according to claim 29, wherein said learning means performs learning such that observation data having the control amount before the transmission dead time and the operating amount at the present time is used as an input signal and the control amount after the response time has elapsed is used as a teacher signal when learning data is generated in accordance with the observation data stored in said observation data storing means.

31. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously; and learning means for learning internal parameters for said adjusting means in accordance with the response time of said control target taken from input of the operating amount from the operating means to said control target to appearance of an influence of the operating amount on the control amount, the transmission dead time taken for the control amount measured by said control target to be supplied to said adjusting means through a transmitting means and the operation delay time taken for the adjustment signal calculated by said adjusting means to appear as the operating amount through said operating means and observation data stored in said observation data storing means.

32. A control apparatus according to claim 31, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount performed by said operating amount correcting means.

33. A control apparatus according to claim 32, wherein said control amount predicting means includes a neural circuit model;

calculations in said operating amount correcting means is performed by error back propagation calculations of said neural circuit model; and said learning means generates learning data in accordance with the response time, the operation delay time, the transmission dead time and observation data stored in said observation data storing means so as to perform learning of the neural circuit model forming said control amount predicting means.

34. A control apparatus according to claim 33, wherein said learning means performs learning such that observation data having the control amount before the transmission dead time and the operating amount after the operation delay time is used as an input signal and the control amount after the response time has elapsed is used as a teacher signal when learning data is generated in accordance with the observation data stored in said observation data storing means.

35. A control apparatus for controlling a control amount of a control target by changing an operating amount which is supplied to the control target, comprising:

adjusting means for calculating an adjustment signal in accordance with the control amount measured by said control target and a target control amount;

operating means for transmitting an operating amount to said control target in accordance with the adjustment signal calculated by said adjusting means;

observation data storing means for storing observation data having control amounts and operating amounts observed previously;

operation delay time measuring means for measuring operation delay time taken for the adjustment signal calculated by said adjusting means to appear as the operating amount through said operating means in accordance with the adjustment signal calculated by said adjusting means and the operating amount transmitted from said operating means;

transmission dead time measuring means for measuring transmission dead time taken for a transmitting means in accordance with the control amount measured by said control target and the control amount supplied to said adjusting means through said transmitting means; and learning means for learning internal parameters for said adjusting means in accordance with the operation delay time measured by said operation delay time measuring means, the transmission dead time measured by said transmission dead time measuring means, response time of said control target taken from input of the operating amount from said operating means to said control target to appearance of an influence of the operating amount on the control amount and observation data stored in said observation data storing means.

36. A control apparatus according to claim 35, wherein said adjusting means comprises virtual operating amount calculating means for calculating a virtual operating amount in accordance with the control amount measured by said control target and the target control amount;

control amount predicting means for predicting a control amount after the response time has elapsed in accordance with the control amount measured by said control target and the virtual operating amount;

operating amount correcting means for correcting the virtual operating amount in accordance with the predicted control amount after the response time has elapsed which has been predicted by said control amount predicting means and the target control amount; and means for supplying, to said operating means, a virtual operating amount as an adjustment signal, said virtual operating amount being obtained by, at least once, performing prediction of the control amount performed by said control amount predicting means and correction of the virtual operating amount performed by said operating amount correcting means.

37. A control apparatus according to claim 36, wherein said control amount predicting means includes a neural circuit model;

calculations in said operating amount correcting means is performed by error back propagation calculations of said neural circuit model; and said learning means generates learning data in accordance with the response time, the operation delay time, the transmission dead time and observation data stored in said observation data storing means so as to perform learning of the neural circuit model forming said control amount predicting means.

38. A control apparatus according to claim 37, wherein said learning means performs learning such that observation data having the control amount before the transmission dead time and the operating amount after the operation delay time is used as an input signal and the control amount after the response time has elapsed is used as a teacher signal when learning data is generated in accordance with the observation data stored in said observation data storing means.

* * * * *